(12) United States Patent
Atapour et al.

(10) Patent No.: US 10,712,252 B2
(45) Date of Patent: Jul. 14, 2020

(54) RESERVOIR DEPLETION/INJECTION SIMULATION UNDER TRUE TRIAXIAL STRESS CONDITIONS

(71) Applicants: Hadi Atapour, Tehran (IR); Ali Mortazavi, Tehran (IR)

(72) Inventors: Hadi Atapour, Tehran (IR); Ali Mortazavi, Tehran (IR)

( * ) Notice: Subject to any disclaimer, the term of this patent is extended or adjusted under 35 U.S.C. 154(b) by 100 days.

(21) Appl. No.: 16/147,766

(22) Filed: Sep. 30, 2018

(65) Prior Publication Data

US 2019/0033198 A1 Jan. 31, 2019

Related U.S. Application Data

(60) Provisional application No. 62/566,550, filed on Oct. 2, 2017.

(51) Int. Cl.
*G01N 15/00* (2006.01)
*G01N 15/08* (2006.01)

(52) U.S. Cl.
CPC ....... *G01N 15/0806* (2013.01); *G01N 15/082* (2013.01)

(58) Field of Classification Search
CPC ... G01N 15/0806; G01N 15/082; G01N 15/08
USPC .............................................. 73/38
See application file for complete search history.

(56) References Cited

U.S. PATENT DOCUMENTS

2018/0313727 A1* 11/2018 Feng .................. G01N 3/12
2020/0018681 A1* 1/2020 Guo ................... G01N 33/18

* cited by examiner

*Primary Examiner* — Jamel E Williams
(74) *Attorney, Agent, or Firm* — Bajwa IP Law Firm; Haris Zaheer Bajwa

(57) ABSTRACT

Disclosed herein is a system for simulating depletion/injection processes under true triaxial stress conditions. The system may include a pressure cell coupled with a true triaxial loading mechanism. A cubical rock specimen may be disposed within the pressure cell and vertical and horizontal loading mechanisms of the true triaxial loading mechanism may compress the cubical rock specimen along three principle axes, while pore pressure within the cubical rock specimen may be increased or decreased by injecting or discharging a pressurized fluid within the pressure cell in order to simulate in situ conditions of a real reservoir.

15 Claims, 14 Drawing Sheets

RESERVOIR DEPLETION/INJECTION SIMULATION UNDER TRUE TRIAXIAL STRESS CONDITIONS

CROSS-REFERENCE TO RELATED APPLICATION

This application claims the benefit of priority from U.S. Provisional Patent Application Ser. No. 62/566,550, filed on Oct. 2, 2017, and entitled "RESERVOIR DEPLETION SIMULATION UNDER REAL ROCK-STRESS AND FLUID PRESSURE FIELDS," which is incorporated herein by reference in its entirety.

TECHNICAL FIELD

The present disclosure relates to systems and methods for simulating reservoir depletion/injection processes and particularly relates to systems and methods for simulating reservoir depletion/injection processes under real rock-stress and fluid-pressure fields.

BACKGROUND

Accurate reservoir characterization is a prerequisite for optimized oil and gas reservoir management, especially accurate estimation of in situ stress changes and pore pressure changes in the reservoir. Reservoir depletion or fluid injection into reservoir during hydrocarbon production or gas storage (natural or $CO_2$) leads to changes in reservoir pore pressure. Consequently, these reservoir pore pressure variations affect the reservoir stressfield that leads to alteration of petrophysical properties of reservoir rock such as porosity and permeability, strength, compressibility, etc. Furthermore, issues such as subsidence, borehole stability problems during drilling, casing collapse, sand production and reactivation of reservoir-bounding and sealing faults are strongly associated with stress changes within the reservoir. In naturally fractured reservoirs, the effects of stress changes on reservoir behavior are even more pronounced, particularly with respect to hydrocarbon fluid flow through fractures. Therefore, knowledge of in situ stresses and accurate prediction of changes in stress state due to reservoir depletion and fluid injection is important in oil and gas reservoir characterization, enhanced oil recovery projects, and reservoir management.

In order to quantify the in situ stress changes due to reservoir depletion or fluid injection into the reservoir, filed data in combination with either an analytical technique or a numerical approach may be utilized. The analytical techniques are used to understand the coupling of stress components and pore pressure (i.e., stress path parameter). In analytical models, the vertical stress or lithostatic stress is assumed to be constant during the reservoir depletion with no strain in the horizontal directions. The analytical models, which are currently used to predict the stress path of reservoir during production, are based on the theory of linear poroelasticity. Assuming a uniaxial strain condition, different models have been developed for isotropic, transversely isotropic, and orthotropic rock behavior. Despite relatively extensive analytical and numerical investigations of depletion effects on reservoir stress state, very limited experimental data is available on the coupling of pore pressure drawdown and reservoir stress components.

Only limited depletion tests are conducted under hydrostatic loading or conventional triaxial compression conditions due to the complexity of the experimental programs and apparatus capable of depletion simulation under true triaxial stress loading. Conventional triaxial compression conditions, which assume that both horizontal stress components are equal, are a rather simplified representation of the general in situ stress state and are not fully representative of the actual ground conditions. A true triaxial stress state that simulates the realistic crustal conditions would be desirable in quantifying the in situ stress changes due to reservoir depletion or fluid injection into the reservoir. There is further a need for simulating the reservoir depletion or fluid injection into the reservoir under true triaxial stress loading condition and a uniaxial strain boundary (constant vertical stress and zero minimum and maximum horizontal strains) condition.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

Consistent with one or more exemplary embodiments, the present disclosure is directed to an exemplary system for simulating depletion/injection processes under true triaxial stress conditions. The system may include a vertical loading mechanism. The vertical loading mechanism may include a vertical loading platen that may be located above a cubical rock specimen in contact with an upper face of the cubical rock specimen, a vertical loading rod in contact with the vertical loading platen, and a vertical actuator coupled with the vertical loading rod and configured to actuate the vertical loading platen downwardly along a vertical axis thereby applying a constant vertical stress to the upper face of the cubical rock specimen. The system may further include a first horizontal loading mechanism. The first horizontal loading mechanism may include a first loading platen that may be in contact with a first lateral face of the cubical rock specimen, a second loading platen that may be in contact with a second opposing lateral face of the cubical rock specimen, a first loading rod in contact with the first loading platen, a second loading rod in contact with the second loading platen, the second loading rod attached to a stationary frame, and a first horizontal actuator coupled with the first loading rod, the first horizontal actuator and the first loading rod configured to actuate the first loading platen along a first horizontal axis thereby urging the first loading platen and the second loading platen relatively toward one another to compress the cubical rock specimen along the first horizontal axis. The system may further include a second horizontal loading mechanism. The second horizontal loading mechanism may include a third loading platen in contact with a third lateral face of the cubical rock specimen, a fourth loading platen in contact with a fourth opposing lateral face of the cubical rock specimen, a third loading rod in contact with the third loading platen, a fourth loading rod in contact with the fourth loading platen, the fourth loading rod attached to a stationary frame, and a second horizontal actuator coupled with the third loading rod, the second horizontal actuator and the third loading rod configured to actuate the third loading platen along a second horizontal axis thereby urging the third loading platen and the fourth loading platen relatively toward one another to compress the cubical rock specimen along the second horizontal axis. The system may further include a first linear variable displacement transducer (LVDT) that may include a first core movable within a first housing that may be attached to the first horizontal loading rod. The first core may be coupled with the second horizontal loading rod, and the first LVDT may be configured to measure relative displacement of the first horizontal loading rod and the second horizontal loading rod along the first horizontal axis. The system may further include a second LVDT that may include a second core movable within a second housing, where the second housing may be attached to the third horizontal loading rod and the second core may be coupled with the fourth horizontal loading rod. The second LVDT may be configured to measure relative displacement of the third horizontal loading rod and the fourth horizontal loading rod along the second horizontal axis.

Consistent with one or more exemplary embodiments, the system for simulating depletion/injection processes under true triaxial stress conditions may further include a pressure cell. The pressure cell may include a main body, an upper end cap, and a lower end cap. The pressure cell may be configured to enclose the cubical rock specimen surrounded by the vertical loading platen, the lower end cap, the first loading platen, the second loading platen, the third loading platen, and the fourth loading platen. The vertical loading rod may extend through an upper axial opening in the upper end cap in a sealed relationship with the upper end cap, and the first loading rod, the second loading rod, the third loading rod, and the fourth loading rod may extend through respective lateral openings in the main body in a sealed relationship with the main body.

Consistent with one or more exemplary embodiments, an exemplary system for simulating depletion/injection processes under true triaxial stress conditions may further include a fluid inlet port that may be present in the upper end cap. The fluid inlet port may be configured to allow injecting a pressurized fluid into the enclosure around the cubical rock specimen to flood the cubical rock specimen. A fluid discharge port may further be present in the lower end cap. The fluid discharge port may be configured to allow discharging the pressurized fluid out of the enclosure. Consistent with one or more exemplary embodiments, the cubical rock specimen may include a central vertical hole that may be in fluid communication with the fluid discharge port.

Consistent with one or more exemplary embodiments, the fluid inlet port may further be equipped with an injection pressure transducer and the fluid discharge port may further be equipped with a discharge pressure transducer.

Consistent with one or more exemplary embodiments, an exemplary system for simulating depletion/injection processes under true triaxial stress conditions may further include an upper rubber sheet that may be interposed between the vertical loading platen and the upper face of the cubical rock specimen sealing an entire surface of the upper face of the cubical rock specimen from the pressurized fluid within the enclosure, and a lower rubber sheet that may be interposed between the lower end cap and a lower face of the cubical rock specimen sealing an entire surface of the lower face from the pressurized fluid within the enclosure. The lower rubber sheet may include a central hole in fluid communication with the central vertical hole of the cubical rock specimen and the fluid discharge port.

Consistent with one or more exemplary embodiments, at least one of the first loading platen, the second loading platen, the third loading platen, and the fourth loading platen may include vertical and horizontal grooves on a respective surface thereof allowing passage of the pressurized fluid within the vertical and horizontal grooves enabling contact of the pressurized fluid with at least one lateral face of the cubical rock specimen.

Consistent with one or more exemplary embodiments, an exemplary system for simulating depletion/injection processes under true triaxial stress conditions may further include at least one wire mesh that may be interposed between at least one of the first loading platen, the second loading platen, the third loading platen, and the fourth loading platen and a respective lateral face of the cubical rock specimen to enable contact of the pressurized fluid with the respective lateral face of the cubical rock specimen.

Consistent with one or more exemplary embodiments, an exemplary system for simulating depletion/injection processes under true triaxial stress conditions may further include a first L-shaped member that may include a first portion and a second portion. The first portion may be perpendicular to the first loading rod and it may be attached to the first loading rod. The second portion may be parallel to the first loading rod and it may be attached to the first housing of the first LVDT. The system may further include a second L-shaped member that may include a third portion and a fourth portion. The third portion may be perpendicular to the second loading rod and it may be attached to the second loading rod. The fourth portion may be parallel to the second loading rod and it may be coupled with the first core of the first LVDT.

Consistent with one or more exemplary embodiments, an exemplary system for simulating depletion/injection processes under true triaxial stress conditions may further include a third L-shaped member that may include a fifth portion and a sixth portion. The fifth portion may be perpendicular to the third loading rod and it may be attached to the third loading rod. The sixth portion may be parallel to the third loading rod and it may be attached to the second housing of the second LVDT. The system may further include a fourth L-shaped member that may include a seventh portion and a eighth portion. The seventh portion may be perpendicular to the fourth loading rod and it may be attached to the fourth loading rod. The eighth portion may be parallel to the fourth loading rod and it may be coupled with the second core of the second LVDT.

Consistent with one or more exemplary embodiments, an exemplary system for simulating depletion/injection processes under true triaxial stress conditions may further include a third LVDT that may be mounted on the vertical loading rod and may be configured to measure displacement of the vertical loading rod along the vertical axis. Consistent with an exemplary embodiment, the vertical axis, the first horizontal axis, and the second horizontal axis are mutually perpendicular.

Consistent with one or more exemplary embodiments, an exemplary system for simulating depletion/injection processes under true triaxial stress conditions may further include a data processing system that may be coupled with the first LVDT, the second LVDT, and the third LVDT. The data processing system may be configured to independently calculate deformations of the cubical rock sample along the vertical axis, the first horizontal axis, and the second horizontal axis based at least in part on data received from the first LVDT, the second LVDT, and the third LVDT.

Consistent with one or more exemplary embodiments, the present disclosure is directed to an exemplary method for measuring deformations of a cubical rock specimen along a horizontal axis. The method may include placing the cubical rock specimen within a horizontal loading mechanism. The horizontal loading mechanism may include a first loading platen in contact with a first lateral face of the cubical rock specimen, a second loading platen in contact with a second opposing lateral face of the cubical rock specimen, a first loading rod in contact with the first loading platen, a second loading rod in contact with the second loading platen, the second loading rod attached to a stationary frame, and a horizontal actuator coupled with the first loading rod, the first horizontal actuator and the first loading rod configured to actuate the first loading platen along a horizontal axis. The method may further include coupling a linear variable displacement transducer (LVDT) with the first loading rod and the second loading rod by coupling a core of the LVDT with the first horizontal loading rod and coupling a housing of the LVDT with the second horizontal loading rod, compressing the cubical rock specimen along the horizontal axis by actuating the first loading platen by the horizontal actuator urging the first loading platen and the second loading platen relatively toward one another, and measuring a relative displacement of the first horizontal loading rod and the second horizontal loading rod by the LVDT.

Consistent with one or more exemplary embodiments, coupling the LVDT with the first loading rod and the second loading rod may include coupling the core of the LVDT with the first horizontal loading rod by a first L-shaped member, the first L-shaped member including a first portion and a second portion, the first portion being perpendicular to the first loading rod, the first portion attached to the first loading rod and the second portion being parallel to the first loading rod, the second portion attached to the housing of the LVDT, and coupling the housing of the LVDT with the second horizontal loading rod by a second L-shaped member, the second L-shaped member including a third portion and a fourth portion, the third portion perpendicular to the second loading rod, the third portion attached to the second loading rod and the fourth portion being parallel to the second loading rod, the fourth portion coupled with the core of the LVDT.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples to provide a thorough understanding of the relevant teachings related to the exemplary embodiments. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be plain to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to exemplary systems and exemplary methods for simulating reservoir depletion/injection processes under true triaxial stress loading conditions and a uniaxial strain boundary condition. An exemplary reservoir depletion/injection simulation system may be utilized to simulate in situ conditions of a reservoir in a realistic manner. The system may be equipped with a pressure cell that may enclose a cubical rock specimen and may be utilized to manipulate the pore pressure within the cubical rock specimen by injection or discharge of a pressurized fluid within the pressure cell. The pressure cell of different exemplary embodiments of the present disclosure may be equipped with stress loading mechanisms that allow for applying true triaxial stress conditions of a reservoir on the cubical rock specimen while changing the pore pressure within the specimen. In order to accurately measure the deformations of the cubical rock specimen under these conditions, the exemplary system may further be equipped with a displacement sensing mechanism that measures the deformations of the cubical rock specimen independent from other deformations in the system, such as the deformations associated with the loading frames of stress loading mechanisms.

Figure 1A:
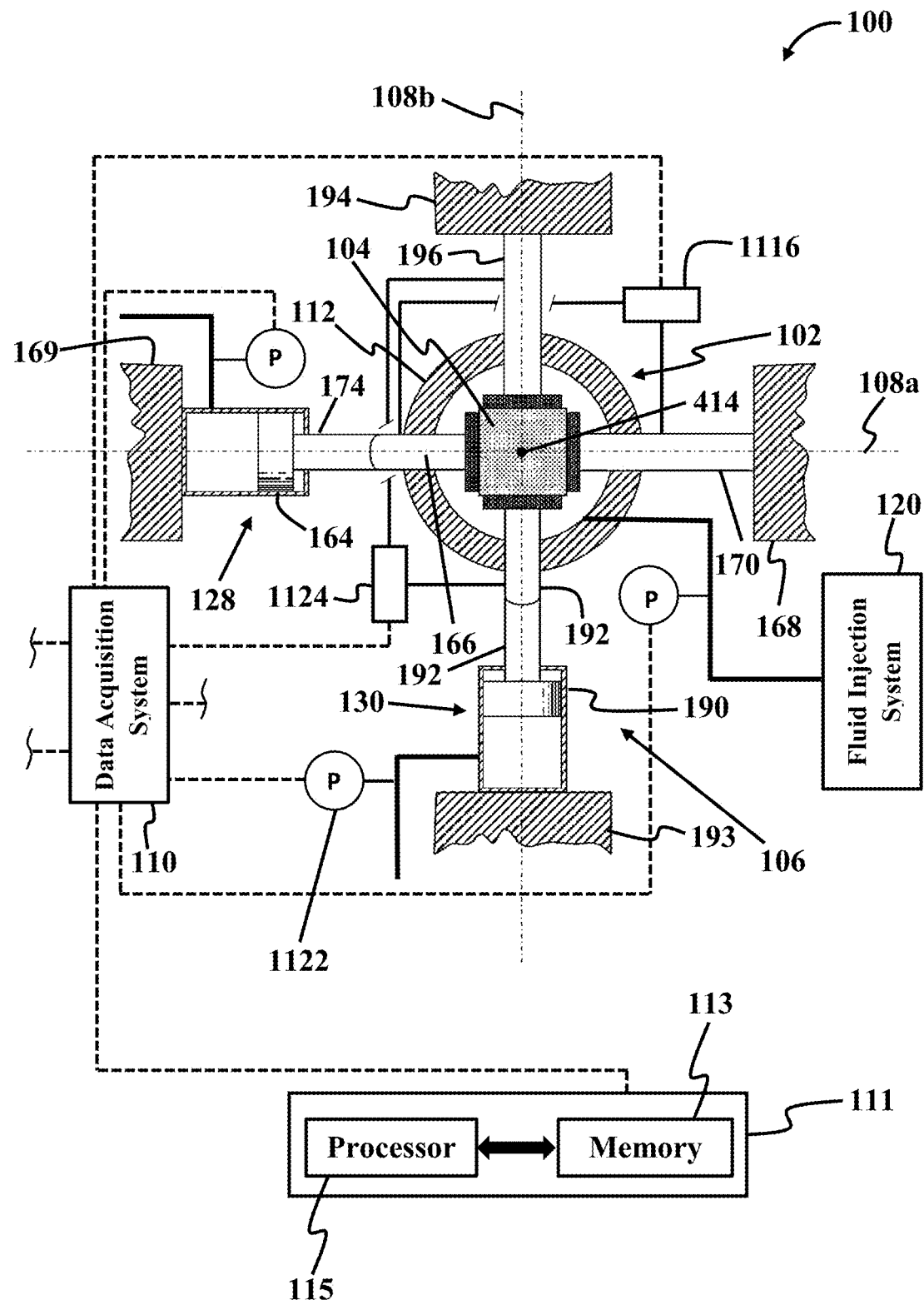
FIG. 1A illustrates a top sectional view of a reservoir depletion/injection simulation system, consistent with one or more exemplary embodiment of the present disclosure.
Figure 1B:
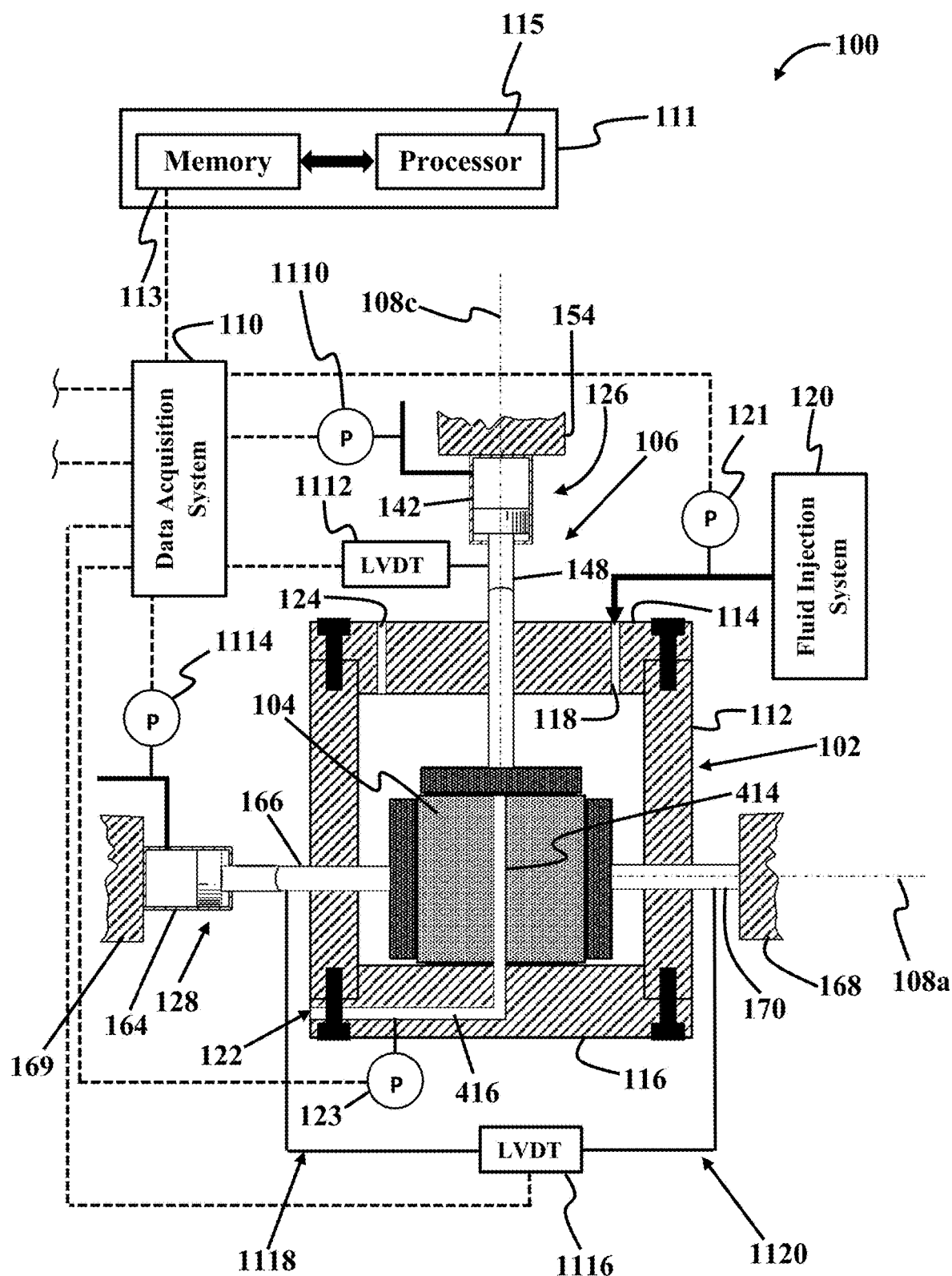
FIG. 1B illustrates a side sectional view of reservoir depletion/injection simulation system, consistent with one or more exemplary embodiment of the present disclosure.

FIG. 1A illustrates a top sectional view of a reservoir depletion/injection simulation system 100, consistent with one or more exemplary embodiment of the present disclosure. FIG. 1B illustrates a side sectional view of reservoir depletion/injection simulation system 100, consistent with one or more exemplary embodiment of the present disclosure.

Referring to FIGS. 1A and 1B, consistent with one or more exemplary embodiments, reservoir depletion/injection simulation system 100 may include a pressure cell 102 in which a cubical rock specimen 104 may be accommodated, a true triaxial loading system 106 that may be configured to apply stress loads on cubical rock specimen 104 in three mutually perpendicular principle axes 108a-c, a data acquisition system 110, and a data processing system 111. In an exemplary embodiment, pressure cell 102 may be utilized for applying pore pressure within cubical rock specimen 104 under true triaxial stress loading conditions provided by true triaxial loading system 106. In an exemplary embodiment, data acquisition system 110 in combination with data processing system 111 may be configured to store the amounts of stress loads applied on cubical rock specimen 104 and calculate the corresponding deformation of cubical rock specimen 104 along three mutually perpendicular principle axes 108a-c. In an exemplary embodiment, data acquisition system 110 in combination with data processing system 111 may further be configured to receive, store, and process pore pressure data under true triaxial stress loading conditions.

Referring to FIG. 1B, consistent with one or more exemplary embodiments, pressure cell 102 may include a main body 112, an upper end cap 114, and a lower end cap 116 that together may define or form a fluid-tight enclosure that may accommodate cubical rock specimen 104. According to one or more exemplary embodiments, a fluid inlet port 118 may be present in upper end cap 114. Fluid inlet port 118 may be in fluid communication with a fluid injection system 120 that may be configured to inject a pressurized fluid into pressure cell 102 via fluid inlet port 118 in order to flood cubical rock specimen 104 with the pressurized fluid thereby applying pore pressure within cubical rock specimen 104. As used herein, pore pressure refers to the pressure of the fluid held within pores of cubical rock specimen 104. In an exemplary embodiment, fluid injection system 120 may be utilized for manipulating the magnitude of pore pressure within cubical rock specimen 104 by manipulating pressure of the pressurized fluid injected into pressure cell 102. In an exemplary embodiment, fluid injection system 120 may be a system that pressurizes a fluid utilizing a fluid pressurizing device such as a pump. In an exemplary embodiment, an injection pressure transducer 121 may be utilized for measuring the pressure of fluid being injected into pressure cell 102 and transmitting the measured pressure to data acquisition system 110.

Referring to FIG. 1B, consistent with one or more exemplary embodiments, a fluid discharge port 122 may be present in lower end cap 116. Fluid discharge port 122 may allow for discharging the pressurized fluid out of pressure cell 102. As the pressurized fluid is discharged out of pressure cell 102 via fluid discharge port 122, fluid within pores of cubical rock specimen 104 may gradually be discharged out of cubical rock specimen 104 and pore pressure within cubical rock specimen 104 may decrease. In an exemplary embodiment, a vent port 124 may be present within upper end cap 114 to allow discharge of air trapped within pressure cell 102 as pressurized fluid is being injected into pressure cell 102. In an exemplary embodiment, a discharge pressure transducer 123 may be utilized for measuring the pressure of fluid being discharged out of pressure cell 102 and transmitting the measured pressure to data acquisition system 110.

Referring to FIGS. 1A and 1B, consistent with one or more exemplary embodiments, true triaxial loading system 106 may include a vertical loading mechanism 126, a first horizontal loading mechanism 128, and a second horizontal loading mechanism 130 that may be configured to apply stress loads on cubical rock specimen 104 in three mutually perpendicular principle axes 108a-c. In an exemplary embodiment, three mutually perpendicular principle axes 108a-c may include a first horizontal axis 108a, a second horizontal axis 108b, and a vertical axis 108c.

Figure 1C:
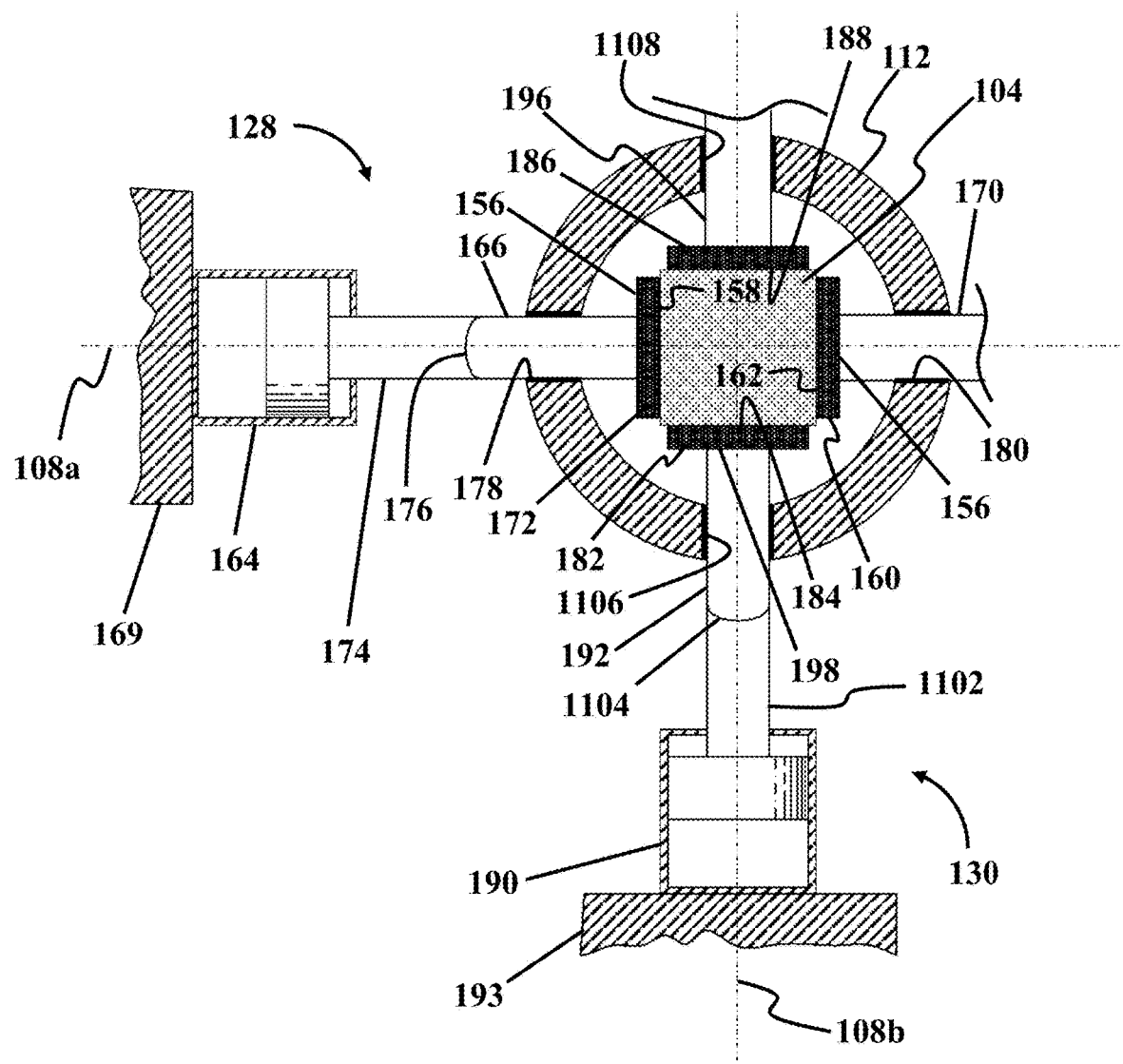
FIG. 1C illustrates a top sectional view of a horizontal loading mechanism, consistent with one or more exemplary embodiments of the present disclosure.
Figure 1D:
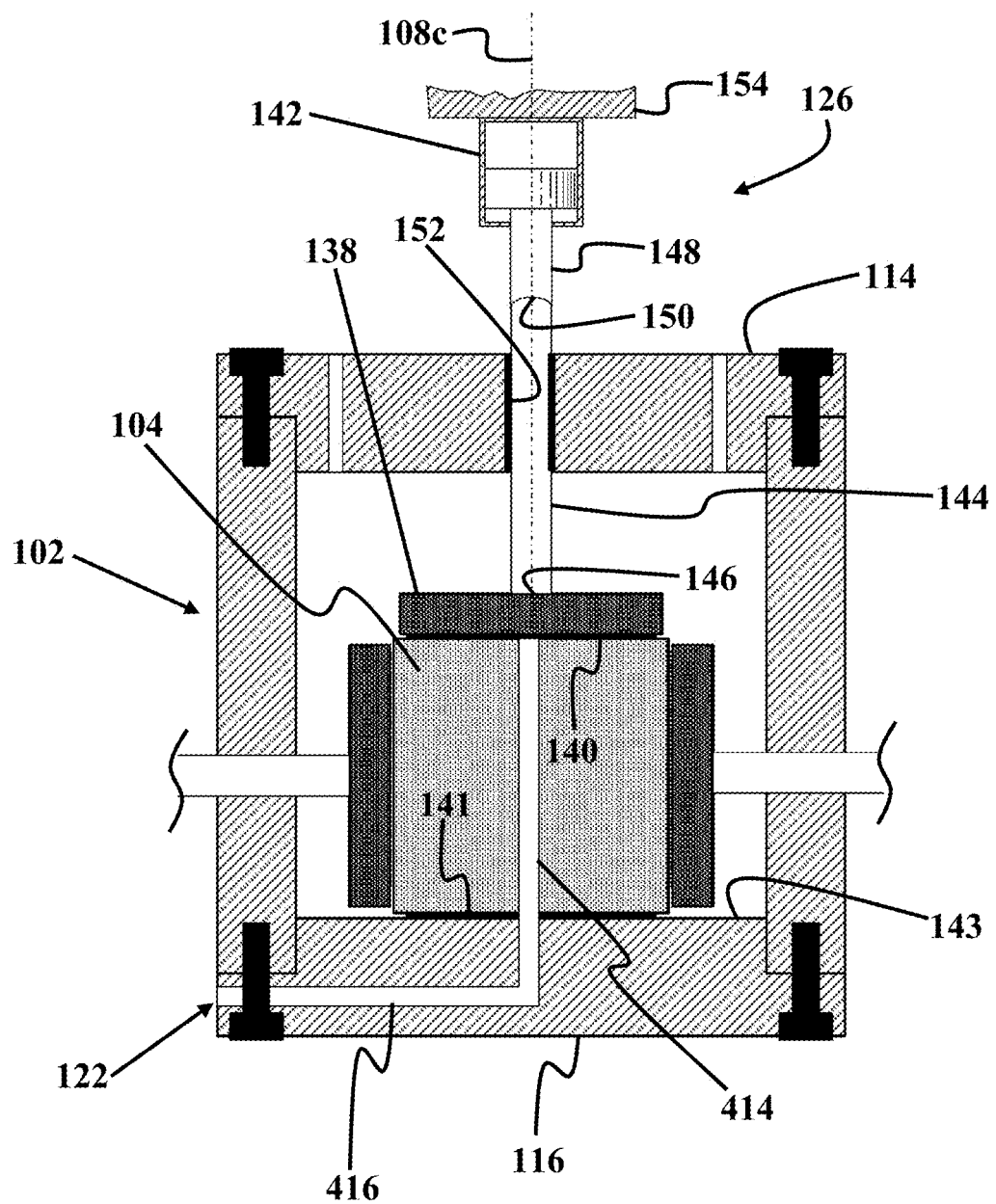
FIG. 1D illustrates a top sectional view of a vertical loading mechanism, consistent with one or more exemplary embodiments of the present disclosure.

FIG. 1C illustrates a top sectional view of horizontal loading mechanism 128, consistent with one or more exemplary embodiments of the present disclosure. FIG. 1D illustrates a top sectional view of vertical loading mechanism 126, consistent with one or more exemplary embodiments of the present disclosure.

Referring to FIGS. 1B and 1D, vertical loading mechanism 126 may include a vertical loading platen 138 that may be positioned above cubical rock specimen 104 in contact with an upper surface 140 of cubical rock specimen 104. Vertical loading mechanism 126 may further include a vertical actuator 142 that may be coupled with vertical loading platen 138 via a vertical loading rod 144 and vertical actuator 142 may be configured to actuate the vertical loading platen 138 downwardly along vertical axis 108c to apply a vertical stress load on cubical rock specimen 104.

Referring to FIG. 1D, in an exemplary embodiment, vertical loading rod 144 may be removably attached to or otherwise be put in contact with vertical loading platen 138 from a first end 146 and coupled to a vertical loading ram 148 of vertical actuator 142 from a second opposing end 150. In an exemplary embodiment, second opposing end 150 may have a spherical surface that may engage a correspondingly spherical curved end surface of vertical loading ram 148. Vertical loading rod 144 may pass through an upper axial opening 152 that may be present in upper end cap 114 in a sealing relationship with pressure cell 102. In an exemplary embodiment, vertical loading rod 144 may be vertically movable within upper axial opening 152 with a fluid tight seal provided within upper axial opening 152. In exemplary embodiments, such an arrangement allows for applying a vertical stress load onto cubical rock specimen 104 within pressure cell 102 along vertical axis 108c without breaking fluid tight seal of pressure cell 102. In an exemplary embodiment, a sealing relationship between vertical loading rod 144 and pressure cell 102 may refer to possible air gaps between vertical loading rod 144 and upper axial opening 152 being sealed by sealing members such as o-rings such that any possible pressurized fluid leakage out of pressure cell 102 through upper axial opening 152 may be prevented.

Referring to FIGS. 1B and 1D, in an exemplary embodiment, true triaxial loading system 106 may further include a uniaxial vertical loading frame 154 on which vertical actuator 142 may be mounted. Uniaxial vertical loading frame 154 may be a rigid steel frame that may provide support for vertical actuator 142. In an exemplary embodiment, a lower surface 141 of cubical rock specimen 104 may rest upon a top surface 143 of lower end cap 116.

Referring to FIGS. 1B and 1C, consistent with one or more exemplary embodiments, first horizontal loading mechanism 128 may include a first loading platen 156 that may be in contact with a first lateral face 158 of cubical rock specimen 104 and a second loading platen 160 that may be in contact with a second opposing lateral face 162 of cubical rock specimen 104. First horizontal loading mechanism 128 may further include a first horizontal actuator 164 that may be coupled with first loading platen 156 via a first loading rod 166 and first horizontal actuator 164 may be configured to actuate first loading platen 156 along first horizontal axis 108a. In an exemplary embodiment, second loading platen 160 may be attached to a second horizontal loading frame 168 by a second loading rod 170.

Referring to FIGS. 1B and 1C, in an exemplary embodiment, first loading rod 166 may be removably attached to or otherwise put in contact with first loading platen 156 from a first end 172 and coupled to a first horizontal loading ram 174 of first horizontal actuator 164 from a second opposing end 176. In an exemplary embodiment, second opposing end 176 may have a spherical surface that may engage a correspondingly spherical curved end surface of first horizontal loading ram 174. First loading rod 166 may pass through a first lateral opening 178 that may be present in main body 112 in a sealing relationship with pressure cell 102. In an embodiment, a sealing relationship between first loading rod 166 and pressure cell 102 may refer to possible air gaps between first loading rod 166 and first lateral opening 178 being sealed by sealing members such as o-rings such that any possible pressurized fluid leakage out of pressure cell 102 through first lateral opening 178 may be prevented.

Referring to FIG. 1C, in an exemplary embodiment, first loading rod 166 may be horizontally movable within first lateral opening 178 with a fluid tight seal provided within main body 112. Second loading rod 170 may pass through a second lateral opening 180 that may be present in main body 112 in a sealing relationship with pressure cell 102. In exemplary embodiments, such an arrangement allows for applying a horizontal stress load onto cubical rock specimen 104 within pressure cell 102 without breaking fluid tight seal of pressure cell 102. Referring to FIG. 1D, in an exemplary embodiment, first horizontal actuator 164 may be mounted on a first horizontal loading frame 169. In an exemplary embodiment, a sealing relationship between second loading rod 170 and pressure cell 102 may refer to possible air gaps between second loading rod 170 and second lateral opening 180 being sealed by sealing members such as o-rings such that any possible pressurized fluid leakage out of pressure cell 102 through second lateral opening 180 may be prevented.

Referring to FIGS. 1A and 1C, consistent with one or more exemplary embodiments, second horizontal loading mechanism 130 may include a third loading platen 182 that may be in contact with a third lateral face 184 of cubical rock specimen 104 and a fourth loading platen 186 that may be in contact with a fourth opposing lateral face 188 of cubical rock specimen 104. Second horizontal loading mechanism 130 may further include a second horizontal actuator 190 that may be coupled with third loading platen 182 via a third loading rod 192 and second horizontal actuator 190 may be configured to actuate third loading platen 182 along second horizontal axis 108b. In an exemplary embodiment, fourth loading platen 186 may be attached to a fourth horizontal loading frame 194 by a fourth loading rod 196 and second horizontal actuator 190 may be mounted on a third horizontal loading frame 193.

Referring to FIG. 1C, in an exemplary embodiment, third loading rod 192 may be attached to third loading platen 182 from a first end 198 and coupled to a second horizontal loading ram 1102 of second horizontal actuator 190 from a second opposing end 1104. In an exemplary embodiment, second opposing end 1104 may have a spherical surface that may engage a correspondingly spherical curved end surface of second horizontal loading ram 1102. Third loading rod 192 may pass through a third lateral opening 1106 that may be present in main body 112 in a sealing relationship with pressure cell 102. In an exemplary embodiment, third loading rod 192 may be horizontally movable within third lateral opening 1106 with a fluid tight seal provided within main body 112. Fourth loading rod 196 may pass through a fourth lateral opening 1108 that may be present in main body 112 in a sealing relationship with pressure cell 102. In an exemplary embodiment, such an arrangement allows for applying a horizontal stress load onto cubical rock specimen 104 within pressure cell 102 along second horizontal axis 108b without breaking fluid tight seal of pressure cell 102. In an exemplary embodiment, a sealing relationship between third loading rod 192 and pressure cell 102 may refer to possible air gaps between third loading rod 192 and third lateral opening 1106 being sealed by sealing members such as o-rings such that any possible pressurized fluid leakage out of pressure cell 102 through third lateral opening 1106 may be prevented. In an embodiment, a sealing relationship between fourth loading rod 196 and pressure cell 102 may refer to possible air gaps between fourth loading rod 196 and fourth lateral opening 1108 being sealed by sealing members such as o-rings such that any possible pressurized fluid leakage out of pressure cell 102 through fourth lateral opening 1108 may be prevented.

Figure 2:
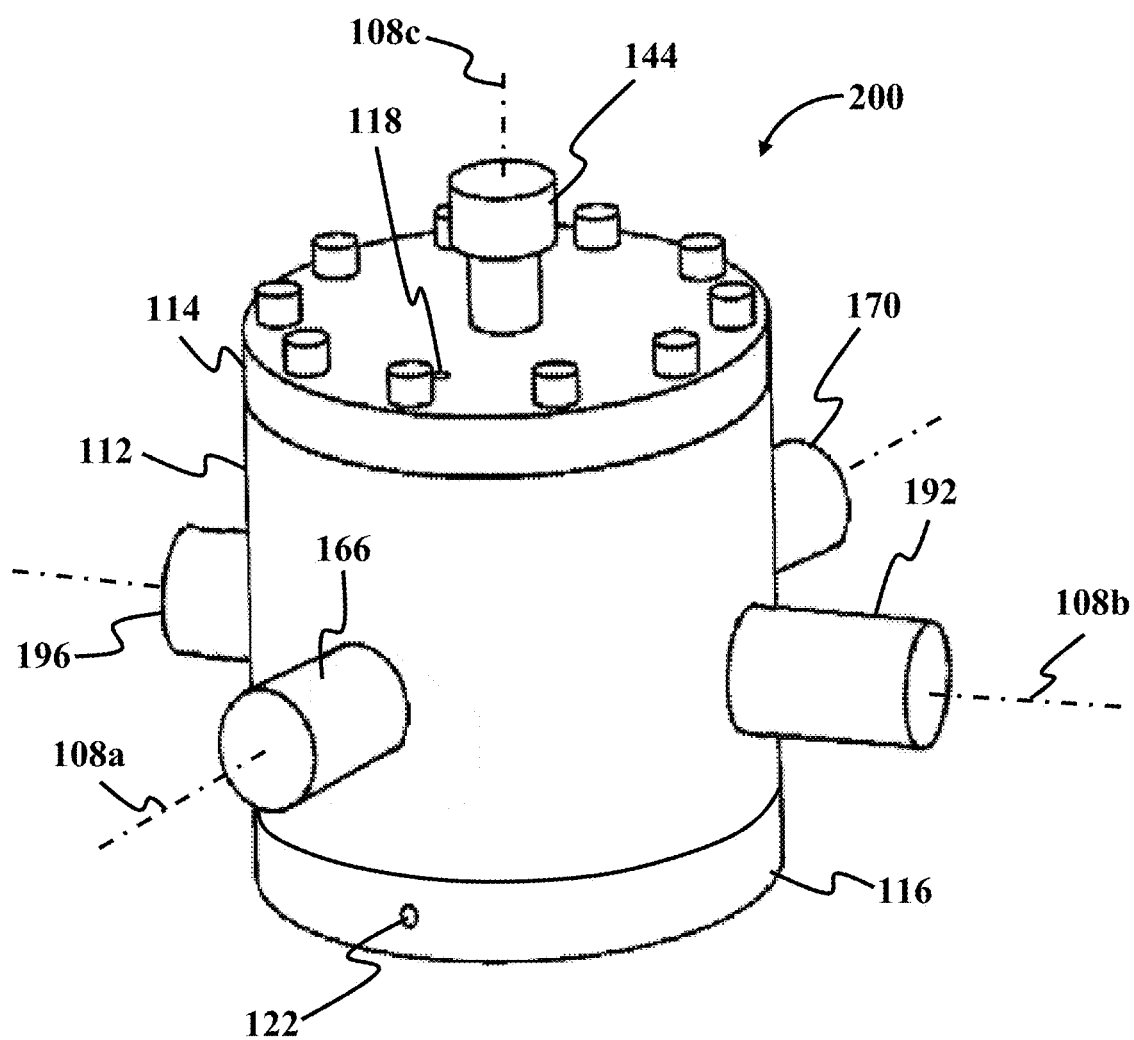
FIG. 2 illustrates a perspective view of a pressure cell, consistent with one or more exemplary embodiments of the present disclosure.

FIG. 2 illustrates a perspective view of a pressure cell 200, consistent with one or more exemplary embodiments of the present disclosure. In an exemplary embodiment, pressure cell 200 may be similar to pressure cell 102 of FIGS. 1A-D and may include main body 112, upper end cap 114, and lower end cap 116 that together define or form a fluid tight enclosure. In an exemplary embodiment, fluid inlet port 118 may be an opening present in upper end cap 114 and fluid discharge port 122 may be present in lower end cap 116. In an exemplary embodiment, pressure cell 102 may further include a plurality of lateral openings through which first loading rod 166, second loading rod 170, third loading rod 192, and fourth loading rod 196 may extend out of main body 112. In an exemplary embodiment, first loading rod 166 and second loading rod 170 may be aligned longitudinally along first horizontal axis 108a, while third loading rod 192 and fourth loading rod 196 may be aligned longitudinally along second horizontal axis 108b. Vertical loading rod 144 may be aligned longitudinally along vertical axis 108c.

Figure 3:
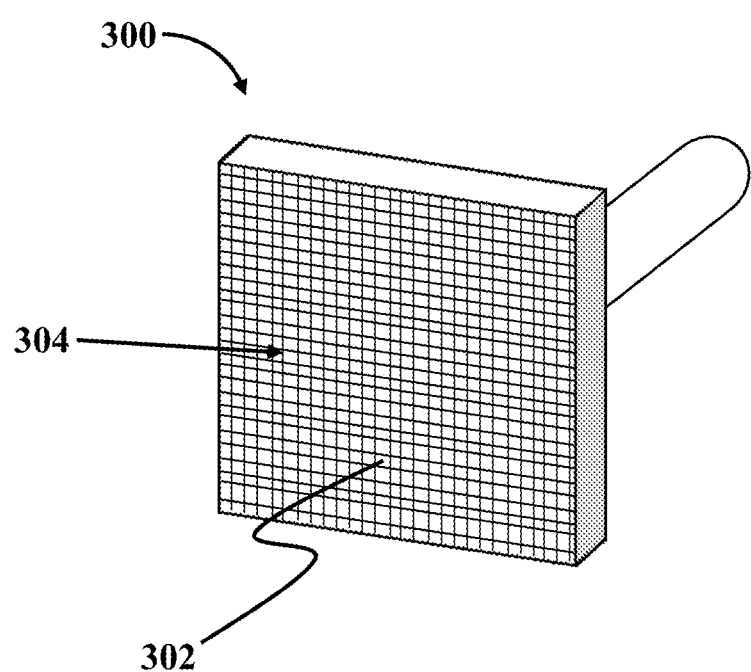
FIG. 3 illustrates a perspective view of a loading platen, consistent with one or more exemplary embodiments of the present disclosure.

FIG. 3 illustrates a perspective view of a loading platen 300, consistent with one or more exemplary embodiments of the present disclosure. Loading platen 300 may include vertical and horizontal grooves on a front surface 302 of loading platen 300 that may form mesh-shaped channels 304. Referring to FIGS. 1A-D and 3, according to an exemplary embodiment, at least one of first loading platen 156, second loading platen 160, third loading platen 182, fourth loading platen 186, and vertical loading platen 138 may be similar to loading platen 300. In an exemplary embodiment, such a configuration allows for the passage of pressurized fluid within mesh-shaped channels 304 enabling contact of the pressurized fluid with a corresponding face of cubical rock specimen 104. In an exemplary embodiment, mesh-shaped channels 304 may include horizontal and vertical microchannels formed on front surface 302 of loading platen 300.

Figure 4:
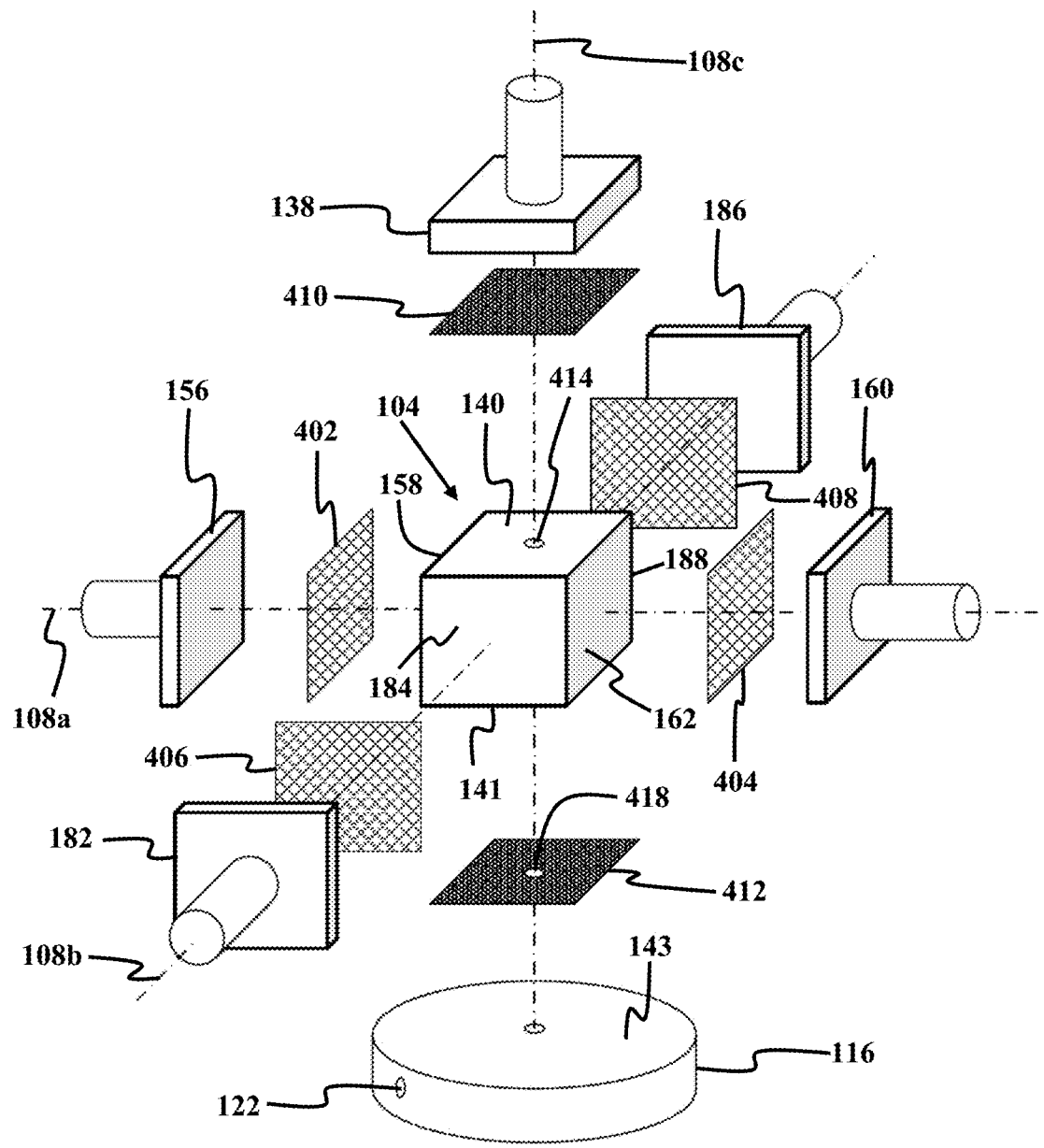
FIG. 4 illustrates an exploded view of a true triaxial loading system, consistent with one or more exemplary embodiments of the present disclosure.

FIG. 4 illustrates an exploded view of a true triaxial loading system, consistent with one or more exemplary embodiments of the present disclosure. Referring to FIG. 4, in order to allow the pressurised fluid circulation around lateral faces 158, 162, 184, and 188 of cubical rock specimen 104, a wire mesh 402 may be placed between first horizontal loading platen 156 and first lateral face 158 of cubical rock specimen 104, a wire mesh 404 may be placed between second horizontal loading platen 160 and second lateral face 162 of cubical rock specimen 104, a wire mesh 406 may be placed between third horizontal loading platen 182 and third lateral face 184 of cubical rock specimen 104, and a wire mesh 408 may be placed between fourth horizontal loading platen 186 and fourth lateral face 188 of cubical rock specimen 104. In an exemplary embodiments, wire meshes 402, 404, 406, and 408 may have similar surface areas to surface areas of corresponding first horizontal loading platen 156, second horizontal loading platen 160, third horizontal loading platen 182, and fourth horizontal loading platen 186. It should be understood that in exemplary embodiments where loading platens 156, 160, 182, and 186 are similar to loading platen 300 of FIG. 3, there is no need for using wire meshes 402, 404, 406, and 408.

Referring to FIG. 4, in an exemplary embodiment, in order to seal entire upper surface 140 and entire lower surface 141 of cubical rock specimen 104 from the pressurized fluid, an upper robber sheet 410 may be placed between vertical loading platen 138 and upper surface 140 and a lower robber sheet 412 may be placed between lower surface 141 and upper surface 143 of lower end cap 116.

Referring to FIG. 1D and FIG. 4, in an exemplary embodiment, a central hole 414 may exist longitudinally within cubical rock specimen 104. Central hole 414 may be in fluid communication with fluid discharge port 122 via a lower channel 416 provided within lower end cap 116. According to an exemplary embodiment, pressurized fluid within pressure cell 102 may be discharged via central hole 414 through lower channel 416 out of fluid discharge port 122. In other words, during reservoir depletion simulation, pressurized fluid may have a radial flow within cubical rock specimen 104 towards central hole 414 and may then exit cubical rock specimen 404 via lower channel 416. Referring to FIG. 4, in an exemplary embodiment, lower robber sheet 412 may have a corresponding central hole 418 that may be aligned with central hole 414 to allow pressurized fluid to be discharged from inside cubical rock specimen 104 into lower channel 416.

Figure 5:
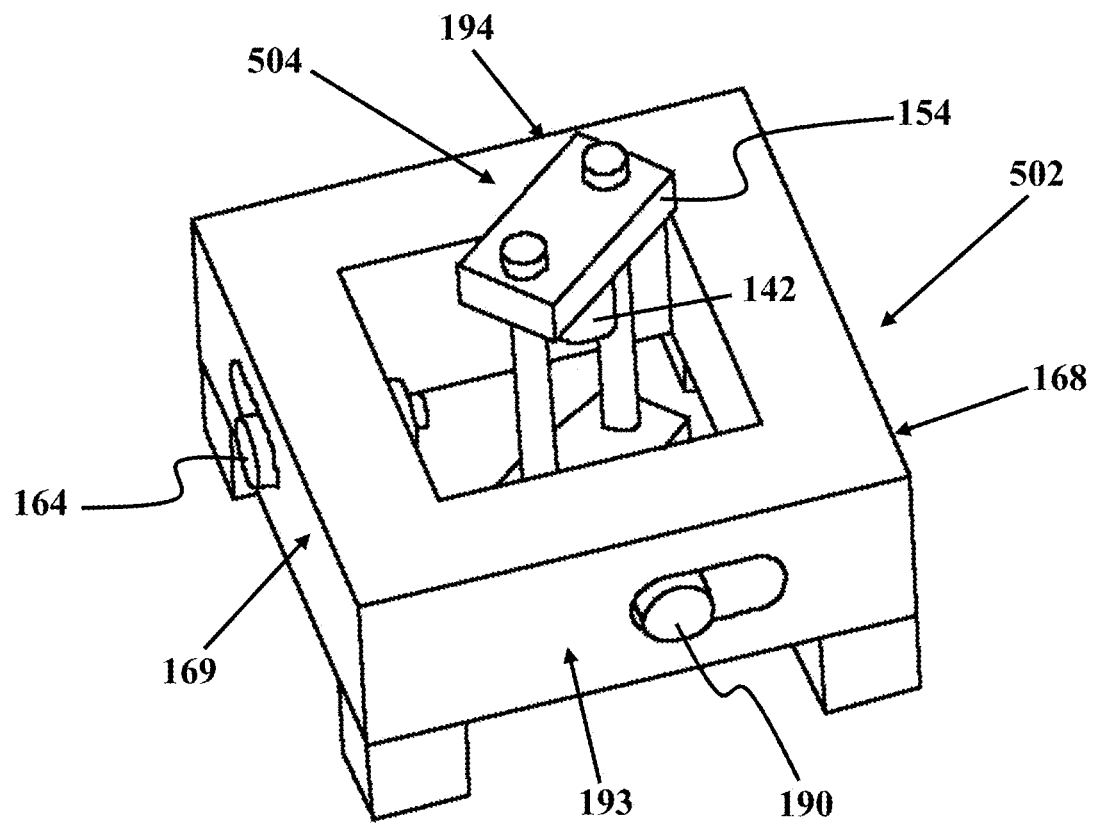
FIG. 5 illustrates a perspective view of a biaxial loading frame and a uniaxial loading frame, consistent with one or more exemplary embodiments of the present disclosure.

FIG. 5 illustrates a perspective view of a biaxial loading frame 502 and a uniaxial loading frame 504, consistent with one or more exemplary embodiments of the present disclosure. Referring to FIGS. 1A-B and 5, in an exemplary embodiment, biaxial frame 502 may provide first horizontal loading frame 169 on which first horizontal actuator 164 may be mounted, second horizontal loading frame 168, third horizontal loading frame 193 on which second horizontal actuator 190 may be mounted, and fourth horizontal frame 194. In an exemplary embodiment, uniaxial loading frame 504 may provide vertical loading frame 154 on which vertical actuator 142 may be mounted.

Referring to FIGS. 1B and 1D, consistent with one or more exemplary embodiments, vertical loading mechanism 126 may further include a first pressure transducer 1110 that may be coupled with vertical actuator 142. First pressure transducer 1110 may be configured to measure an amount of pressure exerted by vertical actuator 142 onto upper surface 140 of cubical rock specimen 104 via vertical loading platen 138 and send the measured amount of pressure to data acquisition system 110. Based on the measured amount of pressure and surface area of vertical loading platen 138, an amount of vertical force exerted onto upper surface 140 of cubical rock specimen 104 along vertical axis 108c may be calculated. Referring to FIG. 1B, consistent with one or more exemplary embodiments, vertical loading mechanism 126 may further include a first displacement sensor 1112 that may be coupled with vertical loading ram 148 of vertical actuator 142. In an exemplary embodiment, first displacement sensor 1112 may be a linear variable displacement transducer (LVDT) that may be configured to measure displacement of vertical loading ram 148 along vertical axis 108c and send the measured displacement to data acquisition system 110. In an exemplary embodiment, the measured displacement of vertical loading ram 148 may correspond to deformation of cubical rock specimen along vertical axis 108c under exerted vertical force.

Referring to FIGS. 1B and 1C, consistent with one or more exemplary embodiments, first horizontal loading mechanism 128 may further include a second pressure transducer 1114 that may be coupled with first horizontal actuator 164. Second pressure transducer 1114 may be configured to measure an amount of pressure exerted by first horizontal actuator 164 onto first lateral face 158 of cubical rock specimen 104 via first horizontal loading platen 156 and send the measured amount of pressure to data acquisition system 110. In an exemplary embodiment, data acquisition system 110 may transmit the measured amount of pressure to data processing system 111. Data processing system 111 may be configured to calculate an amount of horizontal force exerted onto first lateral face 158 of cubical rock specimen 104 along first horizontal axis 108a based on the measured amount of pressure and surface area of first horizontal loading platen 156.

Referring to FIGS. 1B and 1C, consistent with one or more exemplary embodiments, first horizontal loading mechanism 128 may further include a second displacement sensor 1116 that may be configured to measure an amount for relative displacement of first loading rod 166 and second loading rod 170 along first horizontal axis 108a. In an exemplary embodiment, second displacement sensor 1116 may be an LVDT that may be coupled with first loading rod 166 and second loading rod 170 such that for example, a moving core of the LVDT may be coupled with first loading rod 166 and a housing of the LVDT may be coupled with second loading rod 170 or the other way round, the moving core of the LVDT may be coupled with second loading rod 170 and the housing of the LVDT may be coupled with first loading rod 166. In exemplary embodiments, such a configuration allows measuring the relative displacement of first loading rod 166 and second loading rod 170 by second displacement sensor 1116.

Figure 6:
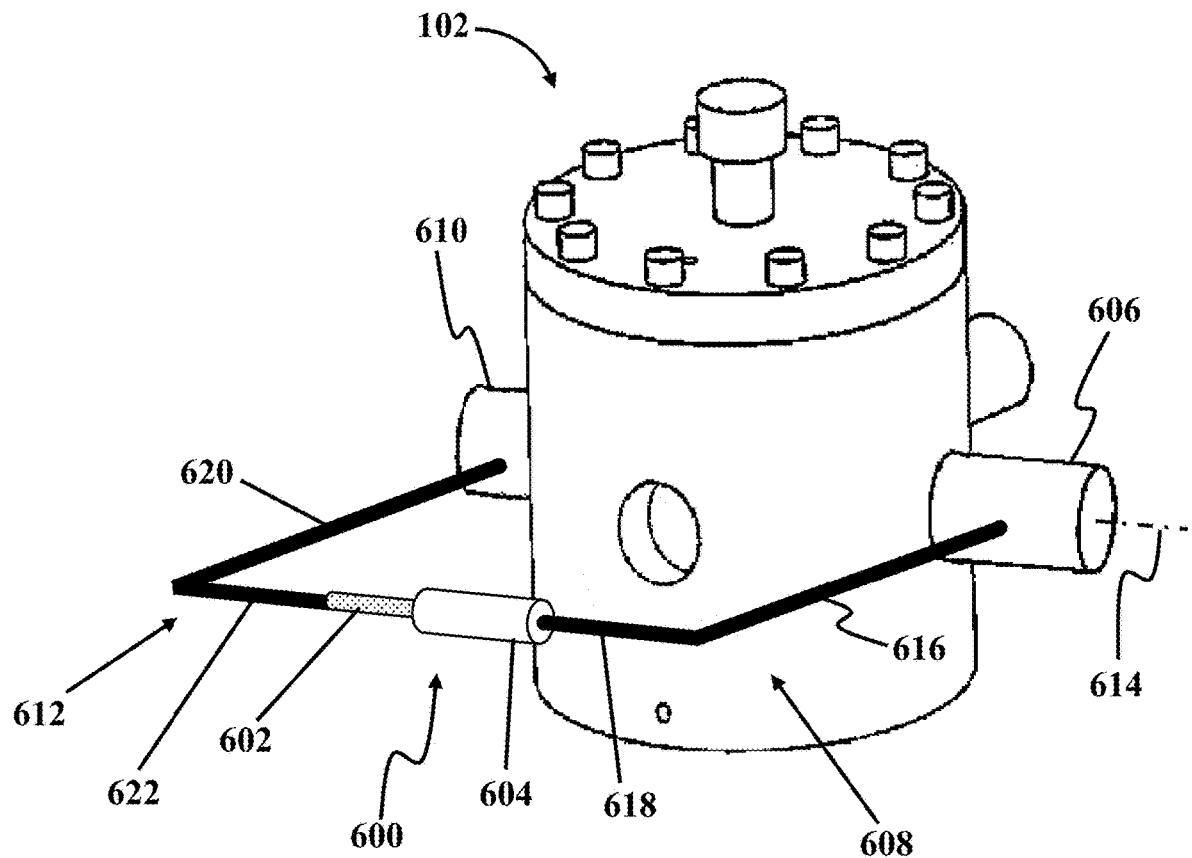
FIG. 6 illustrates a perspective view of a horizontal displacement sensor mounted on a pressure cell, consistent with one or more exemplary embodiments of the present disclosure.

FIG. 6 illustrates a perspective view of a horizontal displacement sensor 600 mounted on pressure cell 102, consistent with one or more exemplary embodiments of the present disclosure. Referring to FIG. 6, horizontal displacement sensor 600 may include a movable core 602 longitudinally movable within a sensor housing 604. In an exemplary embodiment, sensor housing 604 may be coupled with a first horizontal loading rod 606 by a first connection link 608 and movable core 602 may be coupled with a second opposing horizontal loading rod 610 by a second connection link 612. In an exemplary embodiment, as first horizontal loading rod 606 and second opposing horizontal loading rod 610 are actuated toward one another along horizontal axis 614, they urge sensor housing 604 and movable core 602 to move toward one another thereby allowing horizontal displacement sensor 600 to measure the relative displacement of first horizontal loading rod 606 and second opposing horizontal loading rod 610 along horizontal axis 614.

Referring to FIG. 6, in an exemplary embodiment, first connection link 608 may include a first portion 616 perpendicular to first horizontal loading rod 606 and a second portion 618 parallel to first horizontal loading rod 606. In an exemplary embodiment, first portion 616 may be attached to first horizontal loading rod 606 and second portion 618 may be coupled to sensor housing 604. In an exemplary embodiment, second connection link 612 may include a third portion 620 perpendicular to second horizontal loading rod 610 and a fourth portion 622 parallel to second horizontal loading rod 610. In an exemplary embodiment, third portion 620 may be attached to second horizontal loading rod 610 and fourth portion 622 may be coupled to movable core 602.

Referring to FIGS. 1B and 6, second displacement sensor 1116 may be similar to horizontal displacement sensor 600 and may be coupled with first loading rod 166 by a first connection link 1118 that may be similar to first connection link 608. Second displacement sensor 1116 may further be coupled with second loading rod 170 by a second connection link 1120 that may be similar to second connection link 612. In an exemplary embodiment, second displacement sensor 1116 may measure relative displacement of first loading rod 166 and second loading rod 170 along first horizontal axis 108*a* and transmit the measured relative displacement to data acquisition system 110.

Referring to FIGS. 1A and 1C, consistent with one or more exemplary embodiments, second horizontal loading mechanism 130 may further include a third pressure transducer 1122 that may be coupled with second horizontal actuator 190. Third pressure transducer 1122 may be configured to measure an amount of pressure exerted by second horizontal actuator 190 onto third lateral face 184 of cubical rock specimen 104 via third horizontal loading platen 182 and send the measured amount of pressure to data acquisition system 110. In an exemplary embodiment, data acquisition system 110 may transmit the measured amount of pressure to data processing system 111. Data processing system 111 may be configured to calculate an amount of horizontal force exerted onto third lateral face 184 of cubical rock specimen 104 along second horizontal axis 108*b* based on the measured amount of pressure and surface area of third horizontal loading platen 182.

Referring to FIGS. 1A and 1C, consistent with one or more exemplary embodiments, second horizontal loading mechanism 130 may further include a third displacement sensor 1124 that may be configured to measure an amount for relative displacement of third loading rod 192 and fourth loading rod 196 along second horizontal axis 108*b*. In an exemplary embodiment, third displacement sensor 1124 may be an LVDT that may be coupled with third loading rod 192 and fourth loading rod 196 such that for example, a moving core of the LVDT may be coupled with third loading rod 192 and a housing of the LVDT may be coupled with fourth loading rod 196 or the other way round, the moving core of the LVDT may be coupled with fourth loading rod 196 and the housing of the LVDT may be coupled with third loading rod 192. In exemplary embodiments, such a configuration allows measuring the relative displacement of third loading rod 192 and fourth loading rod 196 by third displacement sensor 1124.

Referring to FIGS. 1A and 6, third displacement sensor 1124 may be similar to horizontal displacement sensor 600 and may be coupled with third loading rod 192 by a third connection link 1126 that may be similar to first connection link 608. Third displacement sensor 1124 may further be coupled with fourth loading rod 196 by a fourth connection link 1128 that may be similar to second connection link 612. In an exemplary embodiment, third displacement sensor 1124 may measure relative displacement of third loading rod 192 and fourth loading rod 196 along second horizontal axis 108*b* and transmit the measured relative displacement to data acquisition system 110.

Referring to FIGS. 1A and 1B, consistent with one or more exemplary embodiments of the present disclosure, reservoir depletion/injection simulation system 100 may be utilized for simulating reservoir depletion/injection and stress changes associated with pore pressure drawdown under true triaxial loading condition and uniaxial strain boundary conditions. In an exemplary embodiment, such simulation results may be helpful in a better understanding of the depletion/injection mechanisms involved in complex geomechanical problems and in the evaluation of numerical and analytical methods that are used to simulate the depletion/injection processes. In one or more exemplary embodiments, in order to investigate reservoir pore pressure depletion effect on in situ principle stress values utilizing reservoir depletion/injection simulation system 100 in a laboratory, it is necessary to impose appropriate boundary conditions to cubical rock specimen 104 during simulation. The appropriate boundary condition in some exemplary embodiments may be a uniaxial strain boundary condition, in which the vertical stress along vertical axis 108*c* is constant during the reservoir pore pressure depletion simulation. Furthermore, since earth crust acts against lateral deformation of reservoir in real situations, therefore, lateral strains must be zero during the reservoir pore pressure depletion simulation. Reservoir depletion/injection simulation system 100 is capable of applying a constant vertical stress along vertical axis 108*c* by vertical loading mechanism 126 and keeping zero strains along first horizontal axis 108*a* and second horizontal axis 108*b* by controlling and manipulating the amounts of stress applied by first horizontal loading mechanism 128 and second horizontal loading mechanism 130.

Referring to FIGS. 1A and 1B, consistent with one or more exemplary embodiments of the present disclosure, in order to utilize reservoir depletion/injection simulation system 100 for performing depletion tests, first, central hole 414 may be drilled in cubical rock specimen 104 to represent a borehole. After that, cubical rock specimen 104 may be placed inside pressure cell 102 and then vertical loading platen 138, first loading platen 156, second loading platen 160, third loading platen 182, and fourth loading platen 186 are placed above and around cubical rock specimen 104.

With further reference to FIG. 3, in an exemplary embodiment, first loading platen 156, second loading platen 160, third loading platen 182, fourth loading platen 186, and vertical loading platen 138 may be similar to loading platen 300 and may include mesh-shaped channels on their respective surfaces similar to mesh-shaped channels 304. In an exemplary embodiment, such a configuration may allow for the pressurized fluid within pressure cell 102 to flow freely on four lateral surfaces 158, 162, 184, and 188 of cubical rock specimen 104.

With further reference to FIG. 4, consistent with one or more exemplary embodiments, first loading platen 156, second loading platen 160, third loading platen 182, fourth loading platen 186, and vertical loading platen 138 may have smooth surfaces and in order to permit the pressurized fluid within pressure cell 102 to flow freely on four lateral surfaces 158, 162, 184, and 188 of cubical rock specimen 104, wire mesh 402 may be placed between first horizontal loading platen 156 and first lateral face 158 of cubical rock specimen 104, wire mesh 404 may be placed between second horizontal loading platen 160 and second lateral face 162 of cubical rock specimen 104, wire mesh 406 may be placed between third horizontal loading platen 182 and third lateral face 184 of cubical rock specimen 104, and wire mesh 408 may be placed between fourth horizontal loading platen 186 and fourth lateral face 188 of cubical rock specimen 104.

With further reference to FIG. 4, in an exemplary embodiment, in order to prevent the pressurized fluid to contact upper surface 140 and lower surface 141 of cubical rock specimen 104, upper robber sheet 410 may be placed between vertical loading platen 138 and upper surface 140 and lower robber sheet 412 may be placed between lower surface 141 and upper surface 143 of lower end cap 116. In an exemplary embodiment, in order to put central hole 414 in fluid communication with fluid discharge port 122 via lower channel 416, central hole 418 may exist in lower robber sheet 412 that may be aligned with central hole 414. Since the pressure of pressurized fluid within pressure cell 102 is different from the pressure within central hole 414, a radial flow of the pressurised fluid may be created from lateral faces of cubical rock specimen 104 toward central hole 414. Then the pressurized fluid may exit pressure cell 102 from fluid discharge port 122.

Referring to FIGS. 1A and 1B, consistent with one or more exemplary embodiments of the present disclosure, after placing cubical rock specimen 104 within pressure cell 102 by the above-described method, upper end cap 114 of pressure cell 102 may be closed and all loading rods 144, 166, 170, 192, and 196 may be installed in order to transmit loads from hydraulic actuators 142, 164, and 190 to loading platens 138, 156, 160, 182, and 186. With further reference to FIG. 5, pressure cell 102 may then be sealed and be secured within triaxial loading system 106 between biaxial loading frame 502 and uniaxial loading frame 504. Thereafter, exemplary reservoir depletion/injection simulation system 100 may be ready to perform depletion tests.

Referring to FIGS. 1A and 1B, consistent with one or more exemplary embodiments of the present disclosure, once reservoir depletion/injection simulation system 100 is ready to perform depletion tests, pressurized fluid may be injected into pressure cell 102 via fluid inlet port 118 by fluid injection system 120 in order to saturate cubical rock specimen 104 by a continuous flow of the pressurized fluid until no air bubbles may be observed in fluid flowing out of fluid discharge port 122. Cubical rock specimen 104 may then be loaded independently in all three principle directions along axes 108a-c, while pore pressure within cubical rock specimen 104 may be simultaneously increased by injecting pressurized fluid inside pressure cell 102 to achieve initial stress state and pore pressure condition of a real reservoir. An axial load may be applied along vertical axis 108c to simulate the overburden stress and lateral loads may be applied along horizontal axes 108a and 108b to simulate horizontal stresses that a reservoir rock endures.

It should be understood that, in a laboratory experiment conducted utilizing reservoir depletion/injection simulation system 100, the mechanical behavior of cubical rock specimen 104 is not only a function of stress state and cubical rock specimen 104 properties, but may also be a function of the type of loading path. However, to reach a given stress state, there are infinite loading paths. In a depletion simulation tests, in order to reach the initial reservoir stress state and pore pressure, a loading path, in which the stress ratios are kept constant may be used. This loading path is the most representative path of the in-situ stresses of a reservoir. In other words, stresses and fluid injection pressures may be increased gradually in steps according to constant stress ratios defined for the test. At the end of each stress and pore pressure increasing step, a short holding period may be applied to permit strain equilibrium. Once all principal stresses and the pore pressure reached the anticipated levels, a period of time was allowed for final stabilization of cubical rock specimen 104 under reservoir in situ conditions.

Referring to FIGS. 1A and 1B, consistent with one or more exemplary embodiments of the present disclosure, once cubical rock specimen 104 reaches a final stable state under reservoir in situ conditions, a depletion stage may be started by gradually reducing the pore pressure within cubical rock specimen 104 in steps to simulate oil/gas production in real reservoirs. As the pore pressure decreases, cubical rock specimen 104 may tend to strain in all three principle directions along axes 108a-c. However, to satisfy an odeometric boundary condition, the vertical stress level along axis 108c should be kept constant during the pore pressure drawdown. Also, the lateral loadings along axes 108a and 108b should be controlled and changed in a way to prevent additional lateral strains (to maintain zero lateral strains). At the end of each pore pressure reduction step, a holding period may be applied to permit strain equilibrium. In this condition, the horizontal stresses must be changed in order to maintain zero lateral strains. These changes in horizontal stresses may be representative of the in-situ stress changes due to depletion.

Referring to FIGS. 1A and 1B, consistent with one or more exemplary embodiments, reservoir depletion/injection simulation system 100 may further include a data processing system 111 that may include a memory 113 coupled with a processor 115. In an exemplary embodiment, data processing system 111 may be coupled with data acquisition system 110 and may be configured to receive the measured displacements and pressures acquired by the data acquisition system 110. In an exemplary embodiment, memory 113 may be configured to store the measured displacement and pressure data along with executable instructions to cause processor 115 to process the measured displacement and pressure data to calculate the amounts of stress exerted on cubical rock specimen along axes 108a-c and the amounts of cubical rock specimen deformations along axes 108a-c. In an exemplary embodiment, processor 115 may process displacement data received from first displacement sensor 1112, second displacement sensor 1116, and third displacement sensor 1124 and independently calculate deformations of cubical rock specimen 104 along axes 108a-c based at least in part on data received from first displacement sensor 1112, second displacement sensor, and third displacement sensor.

EXAMPLE

In this example, reservoir depletion/injection simulation system of exemplary embodiments of the present disclosure is utilized to simulate the reservoir in situ conditions in a realistic manner. Here, cubical rock specimen preparation procedure and the testing program for delving into the reservoir depletion mechanics are described.

In an exemplary embodiment, cubical rock specimens may be prepared from sand, Portland cement, and water. The chemical composition of sand grains used in this exemplary embodiment is reported in Table 1.

TABLE 1

Sand Composition Used for Preparation of Cubical Rock Specimens

| $SiO_2$ | $Fe_2O_3$ | $Al_2O_3$ | $K_2O$ | CaO | MgO |
|---|---|---|---|---|---|
| 97.5 | 0.85 | 0.95 | 0.19 | 0.27 | 0.24 |

As reported in Table 1, $SiO_2$ makes up to about 97.5% of the composition and the grain composition is dominated by quartz. Quartz is generally considered as a mineral most resistant to weathering and abrasion during transport. The cubical rock specimens were prepared by mixing the sand grains with cement and water. The cement and water contents were calculated as the ratio of the used cement mass and water mass to the total dry mass of the cubical rock specimens, respectively. Water was mixed with cement and grains to reach a homogeneous paste. The final mix was poured into standard cubical concrete molds of 140×120×120 $mm^3$ and is compressed for a fixed time under a constant pressure. A 10 mm diameter hole was embedded in the center of the cubical rock specimens to represent the borehole. The cubical rock specimens were left in the molds for 24 h (for initial curing) and then submerged into water and cured for 15 days. The cubical rock specimens were dried in a dry room at a temperature of 20° C. for 30 days. The properties determined by tests, performed in dry conditions in the laboratory, were effective porosity (n), dry bulk density (ρd), and Young's modulus (E) which are reported in Table 2.

TABLE 2

Physical and mechanical characteristics of the prepared samples, Porosity (Φ), Dry density ($ρ_d$), Uniaxial compressive strength (UCS), Young's modulus (E), Tensile strength ($σ_t$).

| Φ (%) | $ρ_d$ (g/$cm^3$) | UCS (MPa) | E (GPa) | $σ_t$ (MPa) |
|---|---|---|---|---|
| 27.01 | 1.81 | 14.01 | 4.75 | 1.69 |

Referring to FIGS. 1A and 1B, in an exemplary embodiment, as-prepared cubical rock specimen may be similar to cubical rock specimen 104 that may be secured within pressure cell 102 of reservoir depletion/injection simulation system 100. In an exemplary embodiment, vertical actuator 142 may be equipped with high-precision flow and pressure control valves. Vertical actuator 142 may also be equipped with a high-pressure energy accumulator to increase the response precision and speed of reservoir depletion/injection simulation system 100. The accumulator may also provide the possibility of applying a constant load in the vertical direction along axis 108c during the tests to simulate the boundary conditions of constant stress when it is necessary (e.g. reservoir depletion/injection simulations under uniaxial strain boundary condition). In an exemplary embodiment, vertical actuator 142 may generate an output load of up to 2500 kN, which enable the application of stress levels of 111 MPa on a 150×150 $mm^2$ cross-sectional area. In an exemplary embodiment, first horizontal actuator 164 and second horizontal actuator 190 may have loading capability of 1500 kN.

Referring to FIGS. 1A and 1B, consistent with one or more exemplary embodiments, a series of depletion tests were carried out utilizing reservoir depletion/injection simulation system 100. In these depletion tests, applied major principal stress component was vertical along axis 108c and minor and intermediate components were the minimum and maximum horizontal stresses along axes 108a and 108c. These depletion tests represent the reservoir depletion in a normal faulting regime ($σ_1=σ_v$; $σ_2=σ_H$; $σ_3=σ_h$), which is the typical stress regime for sedimentary basins.

In a first depletion test, the applied initial stress components were 33.2 MPa in the vertical direction along axis 108c and 27.8 MPa and 20.4 MPa in the horizontal directions along axis 108a and 108b ($σ_v$=33.2 MPa; $σ_H$=27.8 MPa; $σ_h$=20.4 MPa). Cubical rock specimen 104 was saturated with hydraulic oil at 15.3 MPa (Pp=2219.1 psi), which is the initial reservoir pressure. Once achieving mechanical equilibrium, oil depletion was performed in a stepwise manner, down to a zero pore pressure level.

Figure 7:
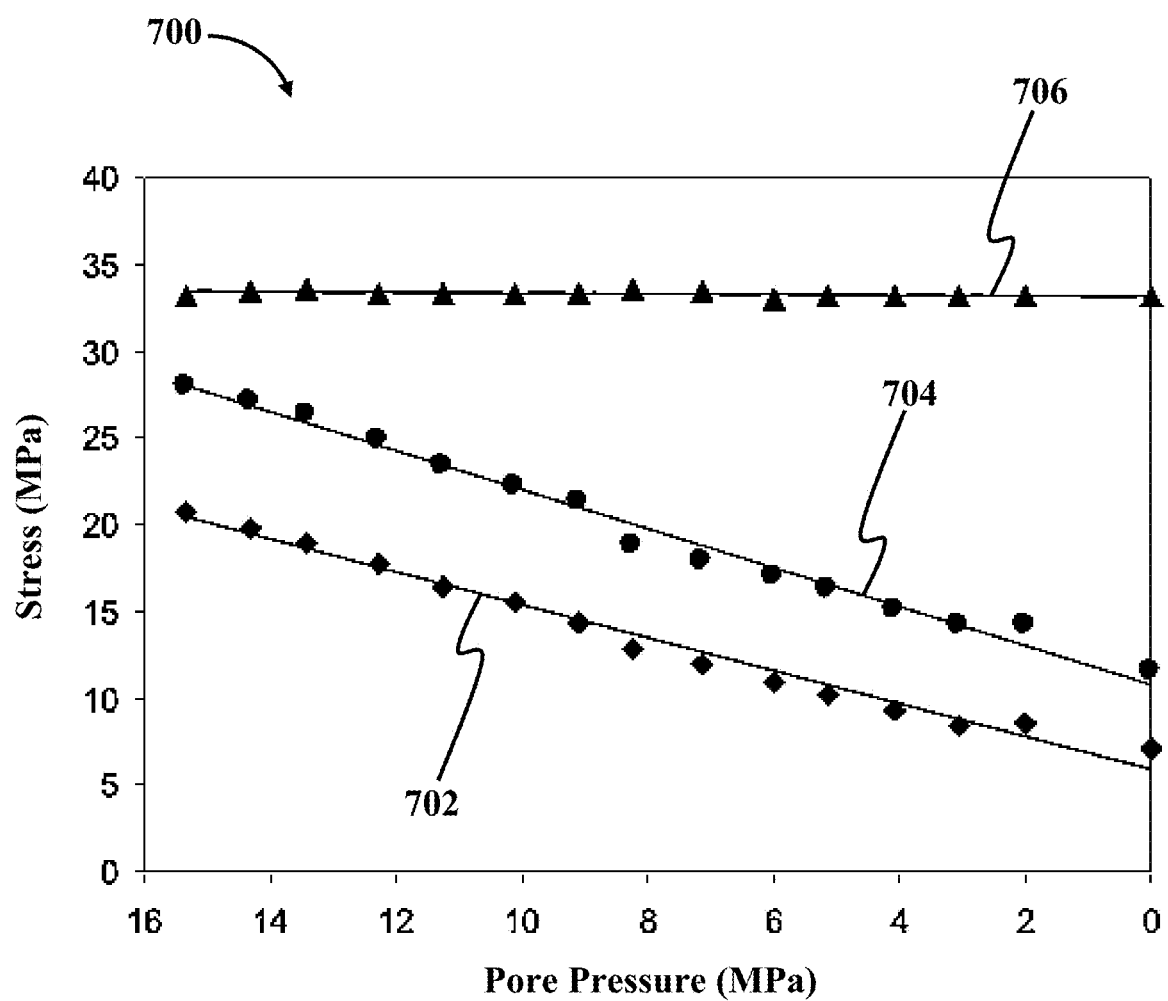
FIG. 7 is a stress versus pore pressure diagram at a constant $\sigma_v=33.2$ MPa, consistent with one or more exemplary embodiments of the present disclosure.

FIG. 7 is a stress versus pore pressure diagram 700 at a constant $σ_v$=33.2 MPa, consistent with one or more exemplary embodiments of the present disclosure. Referring to FIG. 7, stress versus pore pressure diagram 700 includes minimum horizontal stress ($σ_h$) variation versus pore pressure change (plot 702), and maximum horizontal stress ($σ_H$) variation versus pore pressure change (plot 704). Vertical stress is kept constant at 33.2 MPa (plot 706). Referring to FIG. 7, during pore pressure reduction, the vertical stress is maintained fairly constant at 33.2 MPa (4815 psi), while both horizontal stress components decreased linearly with pore pressure. The following Equation (1) and Equation (2) were used to determine the horizontal stress path parameters:

$$\gamma_H = \frac{\Delta\sigma_H}{\Delta P} = 1.08 \quad \text{Equation (1)}$$

$$\gamma_h = \frac{\Delta\sigma_h}{\Delta P} = 0.89 \quad \text{Equation (2)}$$

Equation (1) and Equation (2) indicate that under non-hydrostatic initial horizontal stress conditions ($σ_H≠σ_h$), the maximum horizontal stress path parameter ($γ_H$=1.08) is larger than the minimum horizontal stress path parameter ($γh$=0.89). This means that the rate of maximum horizontal stress loss with reservoir pressure depletion, which is required to maintain uniaxial strain boundary conditions, is larger than the rate of minimum horizontal stress reduction. On the other hand, as is evident in Equation (1), the gradient of the maximum horizontal stress reduction line ($γ_H$=1.08) is larger than unity, indicating that there is a greater reduction in maximum horizontal stress than the corresponding reduction in pore pressure. Referring to FIG. 7, in continuous pore pressure drawdown, the state of stress dynamically changes due to pore pressure/stress coupling.

Figure 8:
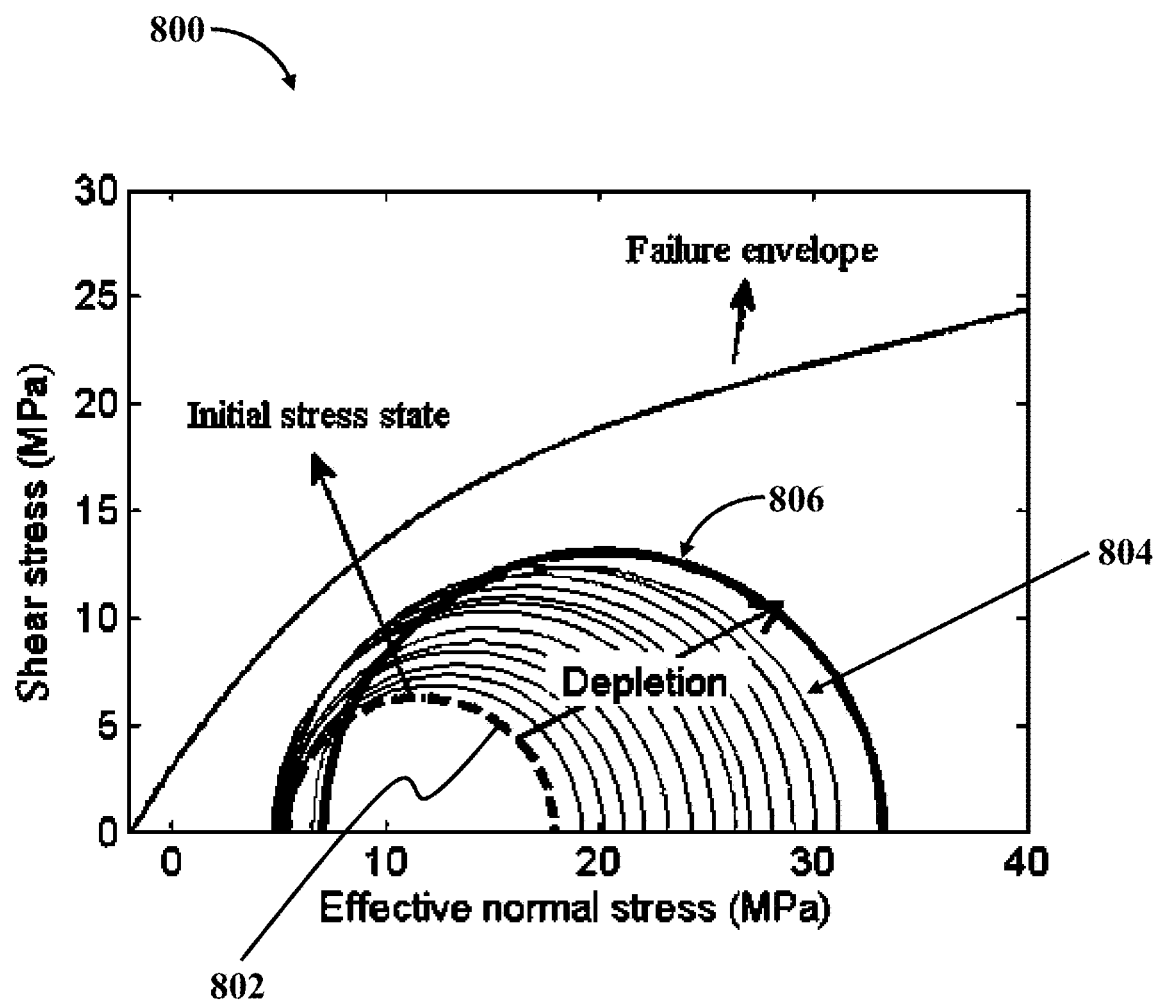
FIG. 8 is a shear stress versus effective normal stress diagram, consistent with an exemplary embodiment of the present disclosure.

FIG. 8 is a shear stress versus effective normal stress diagram 800, consistent with an exemplary embodiment of the present disclosure. FIG. 8 illustrates how the pore pressure/stress coupling is affecting the stress state, and therefore, the rock stability. A dashed circle 802 represents the pre-production stress state and solid lines 804 demonstrate the change in stress state as a function of depletion. After a 15.3 MPa depletion in pore pressure, Mohr's circle

806 shifts to the right with an enlarged radius equivalent to 13.1 MPa and is centered at point (20.1, 0). The boundary condition in this test represented the normal faulting regime ($\sigma_1 = \sigma_v$ and $\sigma_3 = \sigma_h$), therefore, the total vertical stress is not affected by pore pressure variation and remained at 33.2 MPa. Accordingly, for a 15.3 MPa drop in pore pressure, the effective vertical stress is increased by the amount of pore pressure reduction multiplied by Biot's coefficient ($\Delta_{\sigma 1, eff} = -\alpha \Delta P = 15.3$ MPa). Biot's coefficient was assumed to be 1. Moreover, due to pore pressure/stress coupling, a 15.3 MPa pore pressure reduction leads to a 13.64 MPa drop in total minor principal stress and, thus, effective minor principal stress is increased less ($\Delta_{\sigma 3, eff} = \Delta \sigma_h - \alpha \Delta P = 1.7$ MPa). This leads to a larger effective differential stress ($\sigma_{1,eff} - \sigma_{3,eff}$), that causes a larger Mohr circle approaching the failure envelope.

Referring to FIG. 8, the above discussion and results may imply that in a normal faulting stress regime, the depletion induced variations of stress state can increase the likelihood of formation rock failure. This phenomenon has been observed and confirmed in-field for different oil and gas reservoirs. Due to the coupling between pore pressure (Pp) and minor horizontal stress (σh), the effective minor horizontal stress increases less than the effective vertical stress. This leads to an increase in differential effective stress and likelihood of rock failure. Therefore, the coupled nature of pore pressure and stress state must be incorporated into the geomechanical modeling of pore pressure depleted fields.

In order to consider the effect of initial vertical stress on depletion, another set of depletion tests was performed under an increased vertical stress level of 38.6 MPa. The horizontal stresses, applied pore pressure, and experiment procedure were kept identical to the first test ($\sigma_v = 38.5$ MPa; $\sigma_H = 27.8$ MPa; $\sigma_h = 20.4$ MPa; Pp=15.3 MPa).

Figure 9:
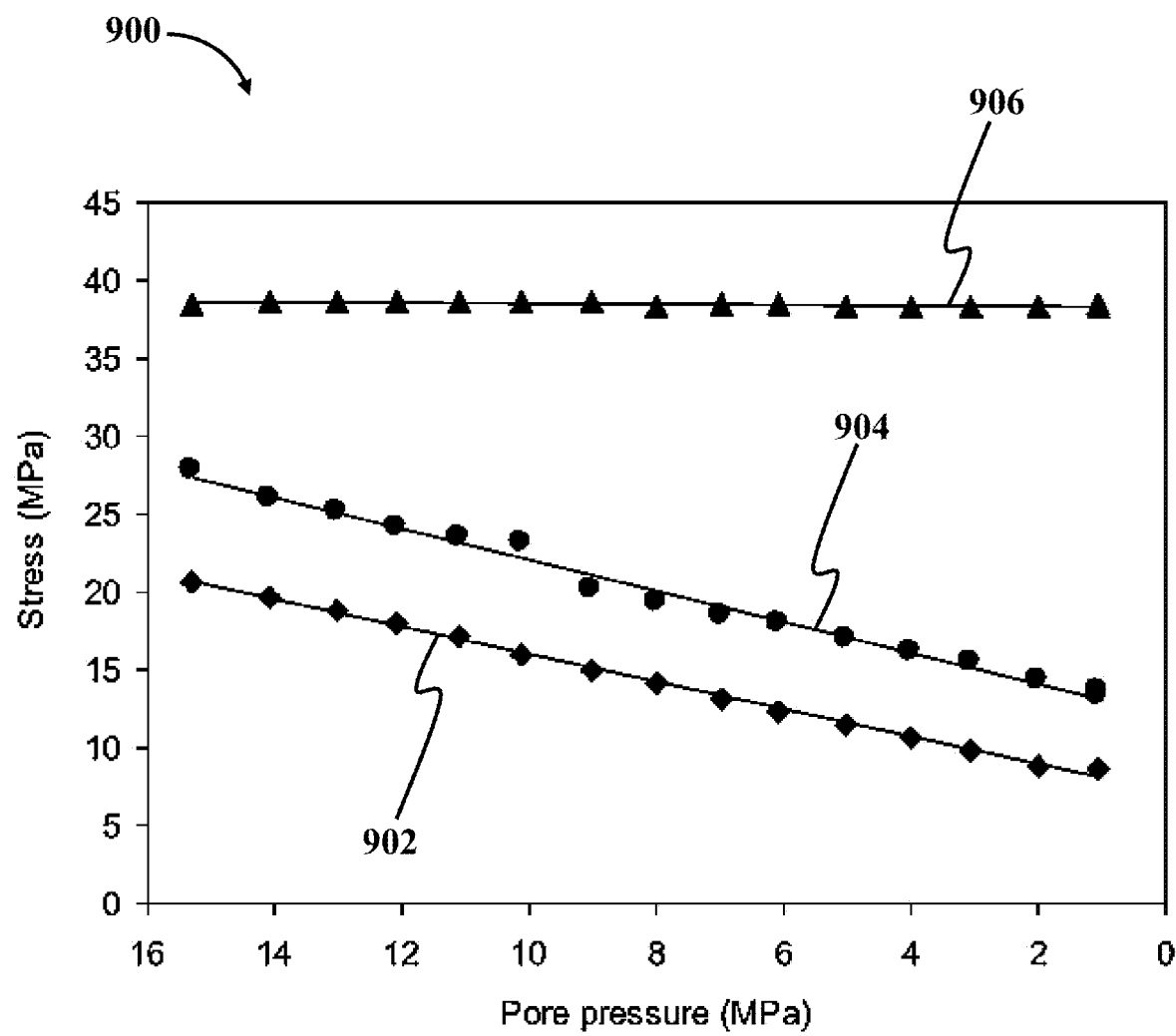
FIG. 9 is a stress versus pore pressure diagram at a constant $\sigma_v=38.6$ MPa, consistent with one or more exemplary embodiments of the present disclosure.

FIG. 9 is a stress versus pore pressure diagram 900 at a constant $\sigma_v = 38.6$ MPa, consistent with one or more exemplary embodiments of the present disclosure. Referring to FIG. 9, stress versus pore pressure diagram 900 includes minimum horizontal stress ($\sigma_h$) variation versus pore pressure change (plot 902), and maximum horizontal stress ($\sigma_H$) variation versus pore pressure change (plot 904). Vertical stress is kept constant at 38.6 MPa (plot 906). FIG. 9 illustrates that the relationship between the horizontal stress components and pore pressure is linear. The horizontal stress path parameters calculated by Equation (1) and Equation (2) are $\gamma_H = 1.0$ and $\gamma_h = 0.84$. Similar to the first test set which was described in detail in connection with FIG. 7, the determined stress path parameters demonstrate that the maximum horizontal stress is more influenced by the pore pressure reduction.

Referring to FIGS. 7 and 9, comparing the results of the conducted experiments, it is evident that the maximum and minimum horizontal stress path parameters decreased ($\gamma_H$ decreased from 1.08 to 1 and $\gamma_h$ decreased from 0.89 to 0.84) when the initial vertical stress increased from 33.3 to 38.5 MPa. This indicates that with a drop in the ratio of horizontal to vertical stress ($\sigma_H/\sigma_v$ from 0.84 to 0.72 and $\sigma_h/\sigma_v$ from 0.61 to 0.53), the effect of pore pressure depletion on horizontal stresses is reduced. In other words, an increase in the pre-production vertical stress level leads to a weaker coupling between pore pressure and in-situ stressfield.

To further examine the obtained results, the vertical stress level was increased to 43.6 and 53.3 MPa and similar depletion tests were carried out. The initial horizontal stress values for these tests were set at 27.8 and 20.4 MPa for the maximum and minimum horizontal stress components respectively and the initial pore pressure was kept at 15.3 MPa. Increasing the vertical stress level to 43.6 MPa, the obtained results show that the maximum and minimum horizontal stress path parameters are decreased to 0.93 and 0.71 respectively. In other words, by increasing the vertical stress level, the reduction rate of both horizontal stresses with pore pressure depletion decreased. In the test with 53.3 MPa vertical stress level, during the depletion and upon reducing the pore pressure to 4.75 MPa, cubical rock specimen started to fail.

In another test, the initial vertical stress level was reduced to 22 MPa and the depletion test was repeated. The initial horizontal stresses and pore pressure conditions were practically the same as previous tests ($\sigma_v = 22$ MPa; $\sigma_H = 27.8$ MPa; $\sigma_h = 20.4$ MPa; Pp=15.3 MPa). Accordingly, unlike previous tests, this test simulated the reservoir depletion in a strike-slip faulting stress regime ($\sigma_1 = \sigma_H$; $\sigma_2 = \sigma_v$; $\sigma_3 = \sigma_h$).

Figure 10:
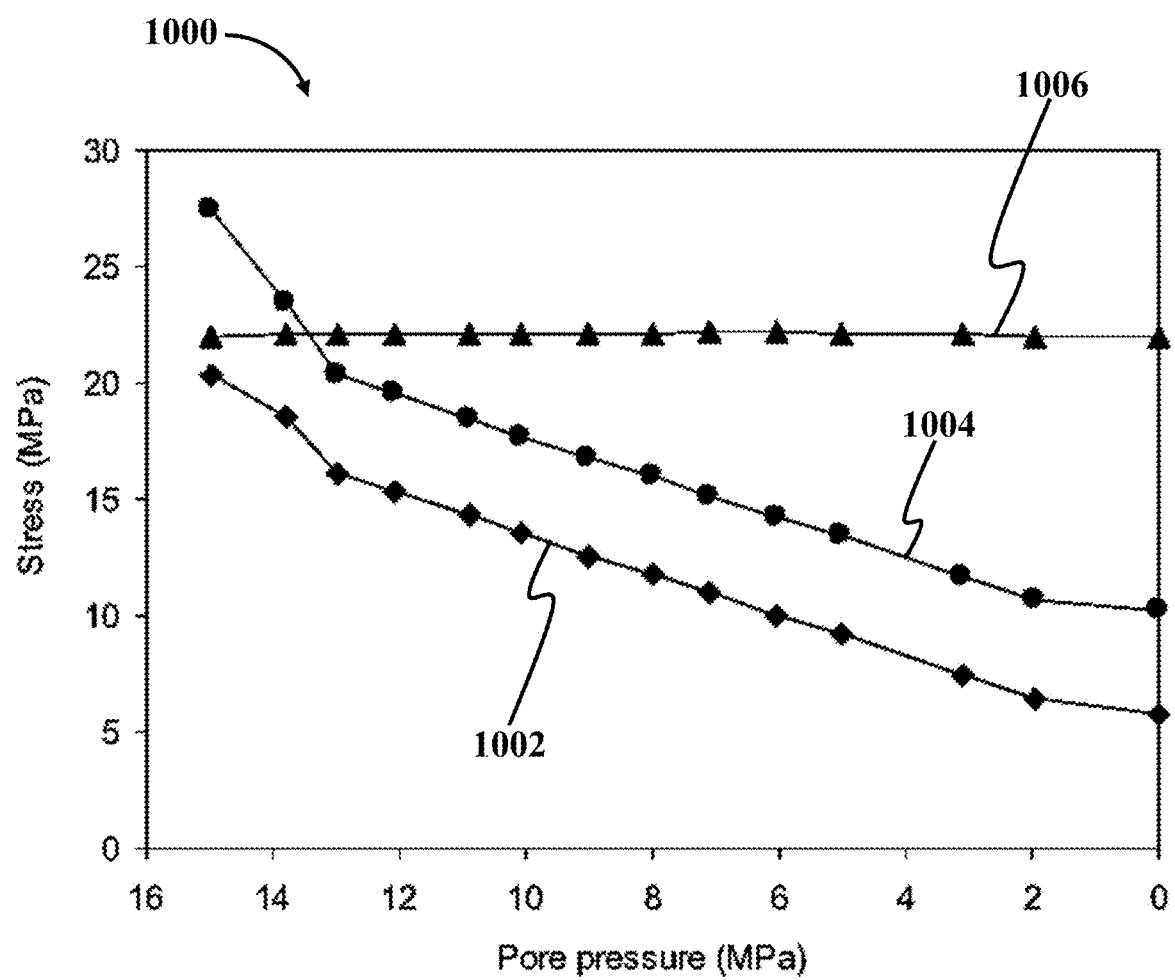
FIG. 10 is a stress versus pore pressure diagram at a constant $\sigma_v=22$ MPa, consistent with one or more exemplary embodiments of the present disclosure.

FIG. 10 is a stress versus pore pressure diagram 1000 at a constant $\sigma_v = 22$ MPa, consistent with one or more exemplary embodiments of the present disclosure. Referring to FIG. 10, stress versus pore pressure diagram 1000 includes minimum horizontal stress ($\sigma_h$) variation versus pore pressure change (plot 1002), and maximum horizontal stress ($\sigma_H$) variation versus pore pressure change (plot 1004). Vertical stress is kept constant at 22 MPa (plot 1006). Referring to FIG. 10, it is observed that a decrease in pore pressure caused both horizontal stresses to decrease. Under this stress conditions, the stress path parameters are calculated as $\gamma_H = 1.15$ and $\gamma_h = 0.97$. When the pore pressure was reduced to about 13.5 MPa, the maximum horizontal stress value, acting as the major principal stress, dropped from 27.8 to 22 MPa. Since the vertical stress remains unchanged during depletion ($\sigma_v = 22$ MPa), upon reduction of maximum horizontal stress to levels less than 22 MPa, the vertical stress becomes the major principal stress. This means that with the rotation of principal stress directions due to depletion, the stress regime changed from the strike-slip to normal faulting regime. Therefore, the pore pressure reduction due to production operation not only alters the magnitude of in situ principle stress components but also their orientation.

Referring to FIG. 10, the test results appear to indicate that the stress regime might be locally changed by production due to pore pressure/stress coupling. The effects of magnitudes and directions of in situ stresses on wellbore instability as well as altering the propagating direction of hydraulic induced fractures have been reported infield observations. It is expected that the hydraulic induced fractures preferentially propagate perpendicular to the minimum principal stress direction while the maximum and intermediate principal stresses affect fracture length and height.

Referring to FIGS. 7, 9 and 10, due to pore pressure reduction, both horizontal stress components start to decrease in a linear trend. It is worthwhile to note that various field studies have illustrated a nearly linear decrease in the minimum total horizontal stress with pore pressure reduction. Moreover, the conducted test results showed that the maximum horizontal stress is more affected and reduced by pore pressure depletion.

Figure 11:
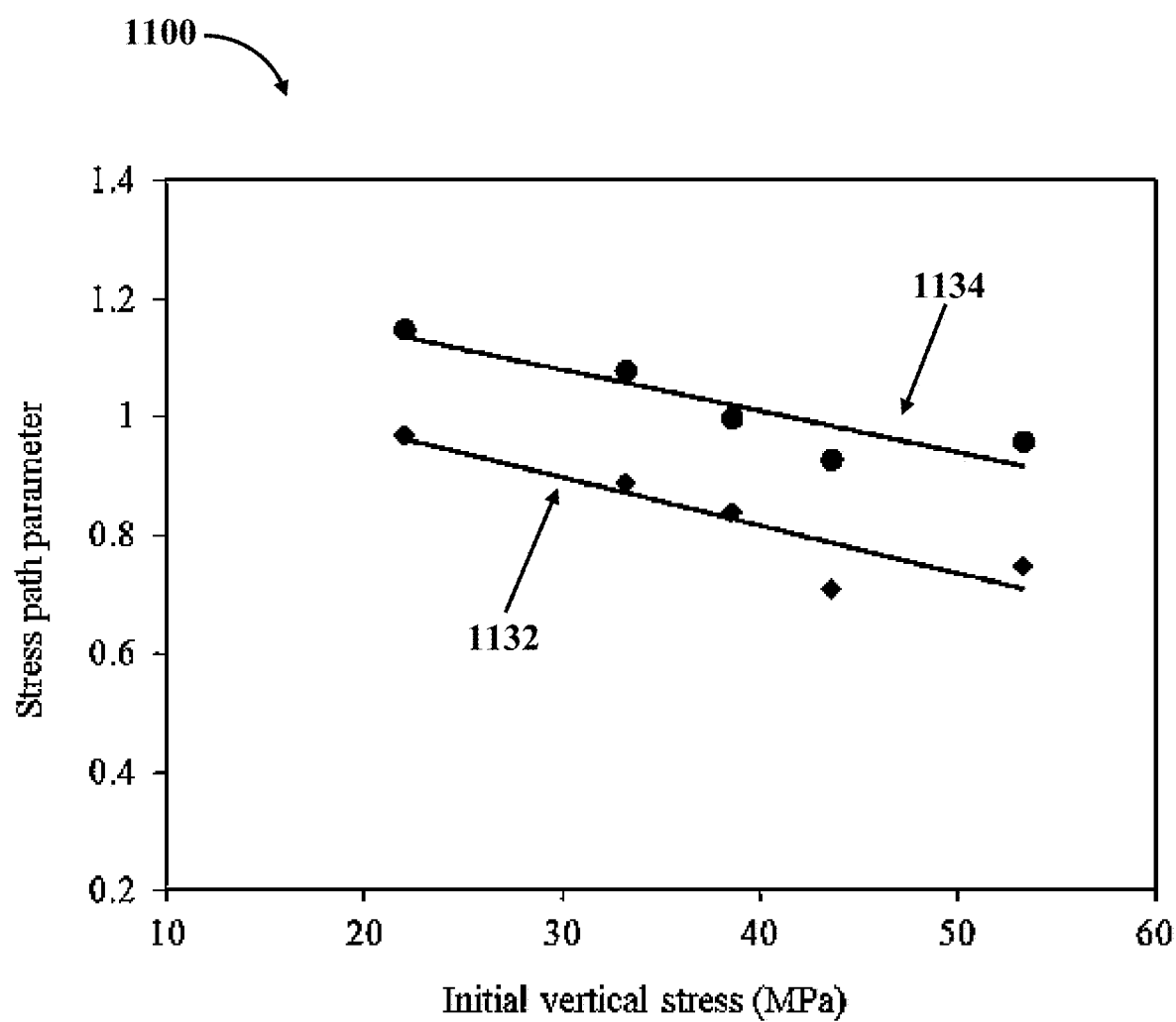
FIG. 11 is a stress path parameter versus initial vertical stress diagram, consistent with one or more exemplary embodiments of the present disclosure.

FIG. 11 is a stress path parameter versus initial vertical stress diagram 1100, consistent with one or more exemplary embodiments of the present disclosure. Referring to FIG. 10, stress versus pore pressure diagram 1000 includes minimum horizontal stress path parameter variation versus initial vertical stress (plot 1132), and maximum horizontal stress path parameter variation versus initial vertical stress (plot 1134). Referring to FIG. 10, it may be observed that varying the initial stress state while maintaining the same pore pressure depletion condition and cubical rock specimen type, the stress path parameters can change significantly. FIG. 11 illustrates that both horizontal stress path parameters decrease as a function of increase in initial vertical stress level ($\sigma_v$) under constant initial horizontal stress components. This dependency can be justified since the cubical rock specimens are vertically compacted and their stiffness is increased, leading to a reduction in Biot's coefficient. The Biot's coefficient of the prepared sandstones was 0.93. With a decrease in the coefficient of Biot, the stress path parameters are reduced. Referring to FIG. 11, these results appear to indicate that the stress path parameters are dependent on the pre-production stress state. Consequently, in a given host rock at different parts of a reservoir, the stress path parameters may vary due to local variations of initial stress state.

In order to get reliable results from reservoir depletion tests as was described in the above example, an accurate measurement of cubical rock specimen deformations in horizontal directions is necessary. Referring to FIG. 1A, consistent with one or more exemplary embodiments, reservoir depletion/injection testing system 100 may allow for accurate measurement of deformations of cubical rock specimen 104 along horizontal axes 108a and 108b. As first horizontal actuator 164 and second horizontal actuator 190 actuate first loading rod 166 and third loading rod 192, respectively to exert horizontal stresses on cubical rock specimen 104 in horizontal directions along axes 108a and 108b, besides deformation of cubical rock specimen 104 along these horizontal axes 108a, 108b, loading frames 169, 168, 193, and 194 may also be deformed under the load exerted by first horizontal actuator 164 and second horizontal actuator 190. The deformations of loading frames 169, 168, 193, and 194 may cause errors in an accurate measurement of deformations of cubical rock specimen 104 along horizontal axes 108a and 108b. To address this issue, instead of directly coupling second displacement sensor 1116 with first horizontal loading ram 174, second displacement sensor 1116 may be coupled with both first loading rod 166 and second loading rod 170 to measure a relative displacement of first loading rod 166 and second loading rod 170 thereby eliminating the errors created by deformations of loading frames 169 and 168. Similarly, instead of directly coupling third displacement sensor 1124 with third loading rod 192, third displacement sensor 1124 may be coupled with both third loading rod 192 and fourth loading rod 196 to measure a relative displacement of third loading rod 192 and fourth loading rod 196 thereby eliminating the error created by deformation of loading frames 193 and 194.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for simulating depletion/injection processes under true triaxial stress conditions, the system comprising:
    a vertical loading mechanism comprising:
        a vertical loading platen located above a cubical rock specimen in contact with an upper face of the cubical rock specimen;
        a vertical loading rod in contact with the vertical loading platen; and
        a vertical actuator coupled with the vertical loading rod, the vertical actuator and the vertical loading rod configured to apply a constant vertical stress to the upper face of the cubical rock specimen by actuating the vertical loading platen downwardly along a vertical axis;
    a first horizontal loading mechanism comprising:
        a first loading platen in contact with a first lateral face of the cubical rock specimen;
        a second loading platen in contact with a second opposing lateral face of the cubical rock specimen;
        a first loading rod in contact with the first loading platen;
        a second loading rod in contact with the second loading platen, the second loading rod attached to a stationary frame; and
        a first horizontal actuator coupled with the first loading rod, the first horizontal actuator and the first loading rod configured to actuate the first loading platen along a first horizontal axis thereby urging the first loading platen and the second loading platen relatively toward one another to compress the cubical rock specimen along the first horizontal axis;
    a second horizontal loading mechanism comprising:
        a third loading platen in contact with a third lateral face of the cubical rock specimen;
        a fourth loading platen in contact with a fourth opposing lateral face of the cubical rock specimen;
        a third loading rod in contact with the third loading platen;
        a fourth loading rod in contact with the fourth loading platen, the fourth loading rod attached to a stationary frame; and
        a second horizontal actuator coupled with the third loading rod, the second horizontal actuator and the third loading rod configured to actuate the third loading platen along a second horizontal axis thereby urging the third loading platen and the fourth loading platen relatively toward one another to compress the cubical rock specimen along the second horizontal axis;
    a first linear variable displacement transducer (LVDT) comprising a first core movable within a first housing, the first housing attached to the first horizontal loading rod and the first core coupled with the second horizontal loading rod, the first LVDT configured to measure relative displacement of the first horizontal loading rod and the second horizontal loading rod along the first horizontal axis; and
    a second LVDT comprising a second core movable within a second housing, the second housing attached to the third horizontal loading rod and the second core coupled with the fourth horizontal loading rod, the second LVDT configured to measure relative displacement of the third horizontal loading rod and the fourth horizontal loading rod along the second horizontal axis.

2. The system according to claim 1, further comprising:
    a pressure cell comprising a main body, an upper end cap, and a lower end cap, the cubical rock specimen surrounded by the vertical loading platen, the lower end cap, the first loading platen, the second loading platen, the third loading platen, and the fourth loading platen enclosed by the pressure cell,
    wherein the vertical loading rod extends through an upper axial opening in the upper end cap in a sealed relationship with the upper end cap, and
    wherein the first loading rod, the second loading rod, the third loading rod, and the fourth loading rod extend through respective lateral openings in the main body, the fourth loading rod in a sealed relationship with the main body.

3. The system according to claim 2, further comprising:
    a fluid inlet port in the upper end cap, the fluid inlet port configured to allow injection of a pressurized fluid into the enclosure around the cubical rock specimen to flood the cubical rock specimen; and
    a fluid discharge port provided in the lower end cap, the fluid discharge port configured to allow discharge of the pressurized fluid out of the enclosure.

4. The system according to claim 3, wherein the fluid inlet port further equipped with an injection pressure transducer and wherein the fluid discharge port further equipped with a discharge pressure transducer.

5. The system according to claim 3, wherein the cubical rock specimen includes a central vertical hole in fluid communication with the fluid discharge port.

6. The system according to claim 4, further comprising:
    an upper rubber sheet interposed between the vertical loading platen and the upper face of the cubical rock specimen sealing an entire surface of the upper face of the cubical rock specimen from the pressurized fluid within the enclosure; and
    a lower rubber sheet interposed between the lower end cap and a lower face of the cubical rock specimen sealing an entire surface of the lower face from the pressurized fluid within the enclosure, the lower rubber sheet comprising a central hole in fluid communication with the central vertical hole of the cubical rock specimen and the fluid discharge port.

7. The system according to claim 5, wherein at least one of the first loading platen, the second loading platen, the third loading platen, and the fourth loading platen includes vertical and horizontal grooves on a respective surface thereof, the vertical and horizontal grooves configured to allow passage of the pressurized fluid within the vertical and horizontal grooves and configured to enable contact of the pressurized fluid with at least one face of the cubical rock specimen.

8. The system according to claim 5, further comprising:
    at least one wire mesh interposed between at least one of the first loading platen, the second loading platen, the third loading platen, and the fourth loading platen and a respective lateral face of the cubical rock specimen, the at least one wire mesh configured to enable contact of the pressurized fluid with the respective lateral face of the cubical rock specimen.

9. The system according to claim 1, further comprising:
    a first L-shaped member comprising a first portion and a second portion, the first portion perpendicular to the first loading rod, the first portion attached to the first loading rod and the second portion being parallel to the first loading rod, the second portion attached to the first housing of the first LVDT; and a second L-shaped member comprising a third portion and a fourth portion, the third portion perpendicular to the second loading rod, the third portion attached to the second loading rod and the fourth portion being parallel to the second loading rod, the fourth portion coupled with the first core of the first LVDT.

10. The system according to claim 9, further comprising:
a third L-shaped member comprising a fifth portion and a sixth portion, the fifth portion perpendicular to the third loading rod, the fifth portion attached to the third loading rod and the sixth portion being parallel to the third loading rod, the sixth portion attached to the second housing of the second LVDT; and
a fourth L-shaped member comprising a seventh portion and a eighth portion, the seventh portion perpendicular to the fourth loading rod, the seventh portion attached to the fourth loading rod and the eighth portion being parallel to the fourth loading rod, the eighth portion coupled with the second core of the second LVDT.

11. The system according to claim 1, further comprising a third LVDT mounted on the vertical loading rod configured to measure displacement of the vertical loading rod along the vertical axis.

12. The system according to claim 11, wherein the vertical axis, the first horizontal axis, and the second horizontal axis are mutually perpendicular.

13. The system according to claim 12, further comprising a data processing system coupled with the first LVDT, the second LVDT, and the third LVDT, the data processing system configured to independently calculate deformations of the cubical rock sample along the vertical axis, the first horizontal axis, and the second horizontal axis based at least in part on data received from the first LVDT, the second LVDT, and the third LVDT.

14. A method for measuring deformations of a cubical rock specimen along a horizontal axis, the method comprising:
placing the cubical rock specimen within a horizontal loading mechanism, the horizontal loading mechanism comprising:
a first loading platen in contact with a first lateral face of the cubical rock specimen;
a second loading platen in contact with a second opposing lateral face of the cubical rock specimen;
a first loading rod in contact with the first loading platen;
a second loading rod in contact with the second loading platen, the second loading rod attached to a stationary frame; and
a horizontal actuator coupled with the first loading rod, the first horizontal actuator and the first loading rod actuating the first loading platen along a horizontal axis;
coupling a linear variable displacement transducer (LVDT) with the first loading rod and the second loading rod by coupling a core of the LVDT with the first horizontal loading rod and coupling a housing of the LVDT with the second horizontal loading rod;
compressing the cubical rock specimen along the horizontal axis by actuating the first loading platen by the horizontal actuator urging the first loading platen and the second loading platen relatively toward one another; and
measuring a relative displacement of the first horizontal loading rod and the second horizontal loading rod by the LVDT.

15. The method according to claim 14, wherein coupling the LVDT with the first loading rod and the second loading rod comprises:
coupling the core of the LVDT with the first horizontal loading rod by a first L-shaped member, the first L-shaped member comprising a first portion and a second portion, the first portion perpendicular to the first loading rod, the first portion attached to the first loading rod and the second portion being parallel to the first loading rod, the second portion attached to the housing of the LVDT; and
coupling the housing of the LVDT with the second horizontal loading rod by a second L-shaped member, the second L-shaped member comprising a third portion and a fourth portion, the third portion perpendicular to the second loading rod, the third portion attached to the second loading rod and the fourth portion being parallel to the second loading rod, the fourth portion coupled with the core of the LVDT.

* * * * *